United States Patent [19]
Ramsay

[11] Patent Number: 5,827,042
[45] Date of Patent: Oct. 27, 1998

[54] SEAL/BEARING ASSEMBLY

[75] Inventor: Thomas W. Ramsay, Kitchener, Canada

[73] Assignee: A. W. Chesterton Co., Stoneham, Mass.

[21] Appl. No.: 770,044

[22] Filed: Dec. 19, 1996

[51] Int. Cl.$^6$ .................................................. F04D 29/10
[52] U.S. Cl. ........................ 415/112; 415/180; 415/231; 277/65; 277/81 R
[58] Field of Search .................................. 415/111, 112, 415/113, 180, 230, 231; 277/15, 59, 65, 69, 81 R

[56] References Cited

U.S. PATENT DOCUMENTS

| | | |
|---|---|---|
| 640,059 | 12/1899 | Whitney . |
| 969,763 | 9/1910 | Newmann . |
| 1,122,987 | 12/1914 | Myers . |
| 1,132,759 | 3/1915 | Bache . |
| 1,205,449 | 11/1916 | Hart . |
| 1,923,597 | 4/1933 | Walker . |
| 3,081,095 | 3/1963 | Hamrick . |
| 3,246,901 | 4/1966 | Wickli . |
| 3,375,015 | 3/1968 | Swearingen . |
| 3,469,895 | 9/1969 | Vandersteen . |
| 3,511,546 | 5/1970 | Muijderman . |
| 3,558,238 | 1/1971 | Van Herpt . |
| 3,877,844 | 4/1975 | Klaus . |
| 4,010,960 | 3/1977 | Martin ......................................... 277/3 |
| 4,231,623 | 11/1980 | Kaufman . |
| 4,305,592 | 12/1981 | Peterson . |
| 4,368,895 | 1/1983 | Okamoto et al. ....................... 277/203 |
| 4,431,199 | 2/1984 | Iwane ......................................... 277/3 |
| 4,462,644 | 7/1984 | Conner . |
| 4,606,652 | 8/1986 | Swearingen ............................. 384/130 |
| 4,614,445 | 9/1986 | Gerkema et al. . |
| 5,125,792 | 6/1992 | Korenbilt ................................ 415/112 |
| 5,167,418 | 12/1992 | Dunford . |
| 5,238,311 | 8/1993 | Katou et al. . |
| 5,249,812 | 10/1993 | Volden . |
| 5,333,955 | 8/1994 | Papa . |
| 5,370,400 | 12/1994 | Newton . |
| 5,370,401 | 12/1994 | Sandgren . |
| 5,372,730 | 12/1994 | Warner . |
| 5,553,868 | 9/1996 | Dunford . |

FOREIGN PATENT DOCUMENTS

| | | |
|---|---|---|
| 1348765 | 4/1964 | France . |
| 35 41 816 | 6/1987 | Germany . |

OTHER PUBLICATIONS

Muijderman, "Analysis And Design of Spiral Groove Bearings," Journal of Lubrication Technology, Jul. 1967.

Stair, "Effect Of Groove Geometry On Viscoseal Performance," Journal of Engineering for Power, Oct. 1967.

McGrew et al, "Analysis And Test Of The Screw Seal In Caminar and Turbulent Operation," Journal of Basic Engineering, Mar. 1995.

Zuk et al, "convective Inertia And Gas Ingestion Effects On Flow Regimes Of The Viscoseal Theory And Experiment," ASLE Transactions 10, 273–293, 1967.

Meric et al, "Convective Inertia Effects In The Viscoseal," Journal of Lubrication Technology, Jul. 1974.

Primary Examiner—Edward K. Look
Assistant Examiner—Richard Woo
Attorney, Agent, or Firm—Rockey, Milnamow & Katz, Ltd.

[57] ABSTRACT

For fitment into the stuffing box of a centrifugal pump. A spiral-groove is cut on the outer surface of the rotor of a pair of tapered bearing surfaces. The groove is 0.02 mm deep, 2 mm wide, and its circumferential length is 50 cm. Barrier-liquid is fed to an entry-mouth of the spiral-groove, and groove generates a pressure in the stuffing box high enough to overcome process pressure. The barrier-liquid may be water. The interface between the bearing surfaces is sealed from the process-fluid and from the outside.

49 Claims, 14 Drawing Sheets

SEAL/BEARING ASSEMBLY

This invention relates to seals and bearings for rotary shafts, and is particularly suitable for use in motor-driven centrifugal pumps.

BACKGROUND TO THE INVENTION

The requirement is increasing for seals to be so constructed that the seal cannot fail in such a way as to release toxic fluids into the environment. Apart from that new requirement, there is the common need in seal design that the seal last for as long a service life as possible without failure; that, when a seal starts to leak, the seal resists leakage flow and does not burst wide open; that the seal be inexpensive to repair—as to the seal itself, the amount of dismantling needed to expose the seal, and the time the equipment is out of service. Versions of the seal-bearing assembly of the invention address these various needs, as will be described.

GENERAL FEATURES OF THE INVENTION

An aim of the invention is to provide a means for generating a large pressure in the stuffing box of a centrifugal pump, i.e a larger pressure than the pressure of the process-fluid.

It is an aim of the invention to achieve this high pressure without resorting to the use of viscous and lubricious barrier-liquids, but to achieve a high pressure even when using water as the barrier-liquid.

It is an aim of the invention to provide a means for controlling the pressure in the stuffing box, and for controlling that pressure in relation to the process-fluid pressure, and in relation to the outside environment pressure.

The invention provides a combined seal and bearing assembly apparatus, comprising a stator and a rotor adapted for rotation about an axis. The apparatus may be installed in place of the stuffing box of a centrifugal pump.

The rotor and the stator components are formed with complementary bearing-surfaces, which are so arranged as to sweep each other in a hydro-dynamic-bearing relationship, over an area termed the bearing area.

One of the bearing-surfaces is formed with a groove, which extends in a spiral configuration along and around the bearing-surface, over the bearing area. The spiral-groove comprises several turns extending over the bearing-surface, the arrangement thereof being such as to leave lands of substantial width between adjacent turns of the spiral-groove. The spiral-groove has an entry-mouth and an exit-mouth.

The apparatus is so structured as to define an entry-chamber and an exit-chamber, being chambers which are in fluid-conveying-communication with the entry-mouth and the exit-mouth respectively, and the apparatus includes a means for conveying a barrier-liquid into the entry-chamber, and away from the exit-chamber.

When the apparatus is driven in rotation, the barrier-liquid flows along the spiral-groove from the entry-mouth to the exit-mouth.

In the invention, the apparatus is so structured that the fit of the bearing-surfaces is a tight running clearance, the clearance or gap between the surfaces being small enough, and the land width between the turns being wide enough, to ensure the establishment and the continuance of a hydro-dynamic film between the bearing-surfaces. Preferably the bearing surfaces are conically tapered, and either the rotor or the stator is made axially movable into and out of the taper.

THE INVENTION IN RELATION TO THE PRIOR ART

The prior art includes structures in which a screw-thread is used to urge process-fluid away from a stuffing-box seal. The screw-thread acts in the manner of a propeller, or in the manner of an archimedean screw, to drive the process-fluid back towards and into the impeller chamber. An example is shown in patent publication U.S. Pat. No. 3,558,238 (1971, Van Herpt).

Other conventional structures have used archimedean screws to create enough force to cause a sleeve to slide axially along a shaft, in order to relieve the force acting between spring-loaded sealing faces. It is arranged that the reaction to the force serves to drive the fluid back towards the impeller. Thus, the faster the shaft rotates, the more the fluid is repelled away from the seal, and the more the seal contact force is relieved. Examples of such structures are shown in U.S. Pat. No. 3,746,350 (1973, Mayer+) and in U.S. Pat. No. 4,243,230 (1981, Baker+).

Shallow grooves in the shape of scrolls have been provided on seal-faces, and serve to move liquid present at the seal-face in a desired direction. Examples are shown in U.S. Pat. No. 4,290,611 (1981, Sedy), U.S. Pat. No. 5,249,812 (1993, Volden+) and U.S.-Re. 34,319 (1993, Boutin+).

The use of very small radial clearances between rotating components, to promote flow in a desired manner, is shown in U.S. Pat. No. 5,372,730 (1994, Warner+).

U.S. Pat. No. 5,553,868 (Dunford, 1996) refers to the use of spiral grooves in pump seals.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
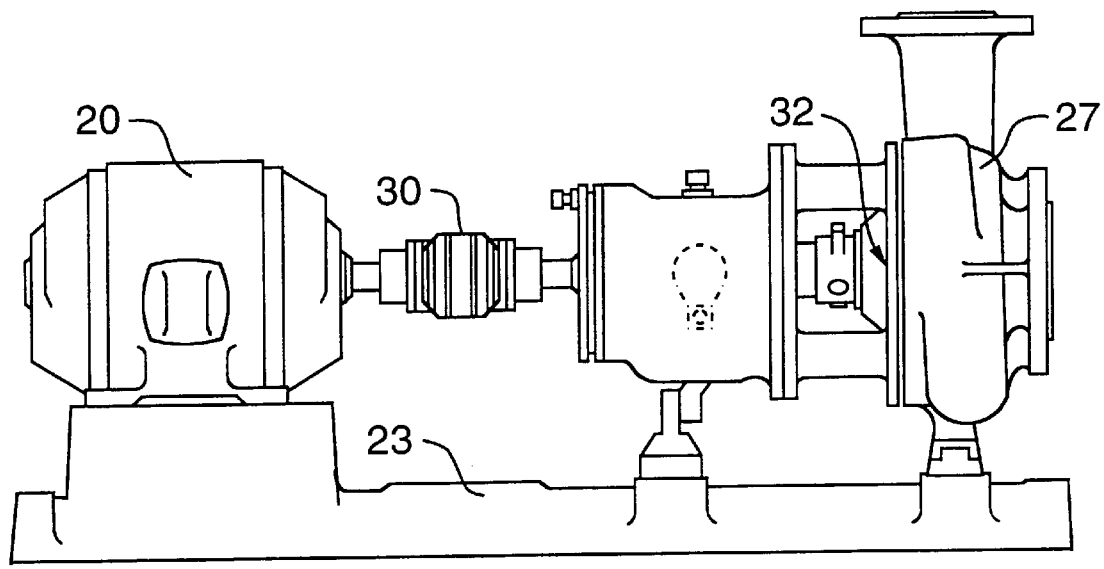
FIG. 1 is a side-elevation of a pump-motor installation.

FIG. 1 shows a pump-motor installation. An electric motor 20 is mounted on a base frame 23, on which are mounted also a bearing box 25 and a centrifugal pump 27. The armature of the motor is connected to the pump drive shaft 29 via a coupling 30.

The rotary shaft 29 is sealed at the stuffing box 32. It is with the design of the stuffing box that the invention is concerned.

Figure 2:
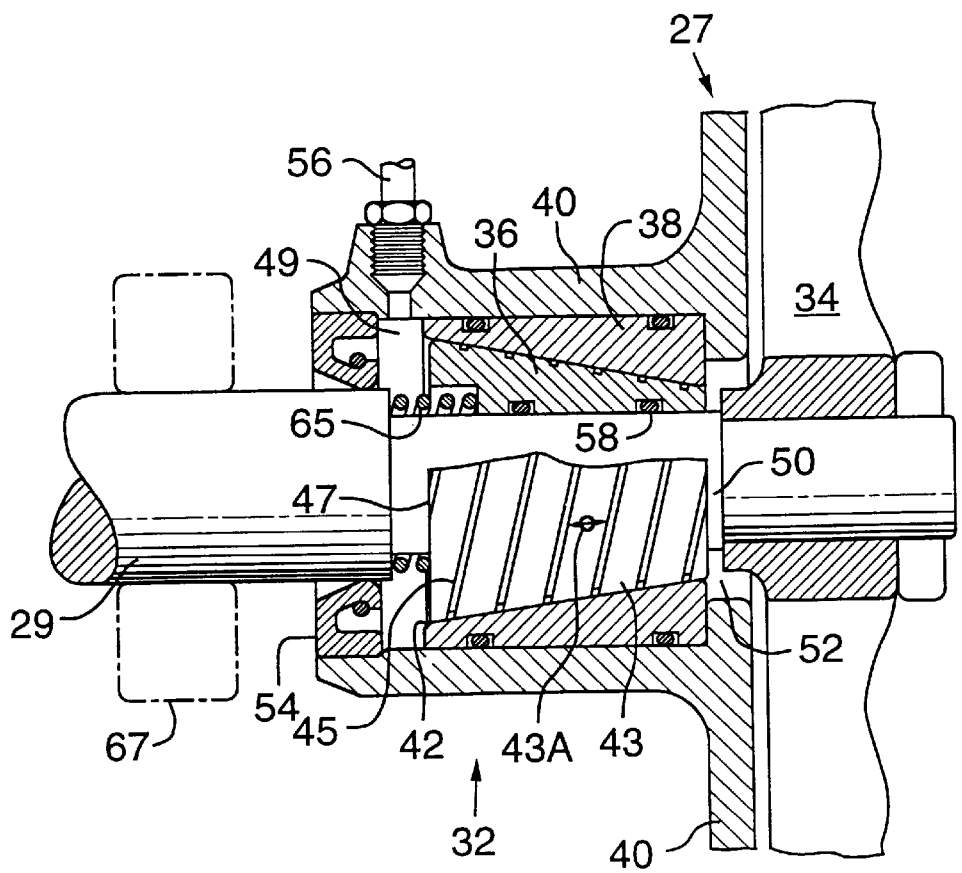
FIG. 2 is a cross-sectioned side-elevation of an apparatus suitable for use in the installation of FIG. 1.

FIG. 2 shows a version of the invention, as applied to the pump-stuffing-box situation. A pump impeller 34 is keyed to the shaft 29. A rotary inner sleeve 36 is also keyed to the shaft 29. A static outer sleeve 38 is keyed to the housing 40 of the pump 27.

The inside surface 42 of the outer sleeve 38 is plain. The outside surface 43 of the rotary sleeve 36 is formed with a (single) spiral groove 45. The left-hand mouth 47 of the groove 45 opens into an entry-chamber 49. The right-hand mouth 50 of the groove 45 opens into an exit-chamber 52.

The entry-chamber 49 is sealed to the outside by means of a conventional rubber lip-type seal 54. The entry-chamber 49 is connected to a source of barrier-liquid via a port 56. The exit-chamber 52 is open to the inside of the impeller housing 40, i.e is open to the process fluid being pumped by the pump 27.

The inner and outer, rotor and stator, sleeves are sealed to the shaft and housing respectively by means of 0-rings 58.

In use, the shaft 29 is driven into rotation by the electric motor, whereby the sleeve 36 rotates. The groove 45 therefore rotates, and its spiral configuration means that a molecule of liquid positioned in the groove will be carried along the groove. The direction of rotation of the motor 20 is arranged to be such that the molecule is carried to the right (in the orientation of the drawings); that is to say, from the entry-chamber 49 towards the exit-chamber 52.

The action of the spiral groove 45 in driving the molecules of barrier-liquid to the right serves to create a higher pressure of the barrier-liquid in the exit-chamber 52 than in the entry-chamber 49. In fact, the pressure of the barrier-liquid in the entry-chamber, where the barrier-liquid is picked up by the groove, may be at atmospheric pressure or thereabouts; the pressure in the exit chamber, where the barrier-liquid exits from the groove, can, by the action of the spiral groove, exceed the pressure of the process-fluid.

As such, the pair of sleeves 36,38 serves as a very effective seal against leakage of process-fluid out through the stuffing box 32. So long as the shaft 29 remains turning, and a supply of barrier-liquid is present at the port 56, the exit-chamber 52 will be filled with pressurised barrier-liquid.

Even if the process-fluid should be dead-headed (that is to say, the outlet pipe conveying the process-fluid away from the pump is blocked), the sleeves 36,38, with the spiral groove, still serve to pump barrier-liquid into the exit-chamber 52.

If the inlet pipe to the pump should be blocked, whereby the interior or impeller chamber of the pump is subject to vacuum, and cavitates, the barrier liquid is still pumped through into the exit chamber. By contrast, in some conventional designs, cavitation in the pump intake line can lead to liquids being sucked out of the stuffing box, to cavitation in the stuffing box, and to the consequent degradation of the sealing capability of the stuffing box.

The barrier-liquid can easily be kept clean (e.g by filtering), and the barrier liquid is forced out of the exit-mouth 50 of the groove 45. Therefore, the sleeves 36,38 and the surfaces 42,43, are kept free of any grit that may be present in the process-fluid. Process-fluid is often dirty, and can contain grit or other harmful materials, but the dirt is filtered out before the process-fluid can enter the groove or the surfaces 42,43.

The barrier-liquid fills the groove 45, and also forms a hydro-dynamic film that resides between the inner surface 42 of the outer sleeve 38 and the outer surface 43 of the inner sleeve 38; or at least between the surface 42 and the lands 43A of the surface 43 lying between the turns of the groove 45.

The barrier-liquid is supplied to the entry-chamber 49, and is drawn into the entry-mouth 47 of the groove. As a result, no part of the bearing area, i.e of the swept areas of the surfaces 42,43, is dry. Indeed, no part of the bearing area is dry even when the pump is cavitating (i.e sucking on no process-fluid).

The barrier-liquid is supplied to the port 56 at, or around, atmospheric pressure. The barrier-liquid does not have to be pre-pressurised outside the stuffing-box to a pressure higher than the process pressure: the action of the spiral-groove 45 serves to pressurise the barrier-liquid. In fact, the port 56 may be connected to a supply-pipe which simply dips into a reservoir of barrier-liquid, and the level of the liquid in the reservoir may be below the level of the port, whereby the barrier-liquid is drawn into the entry-chamber 49 at a pressure slightly below atmospheric. (The lip-seal 54 would then have to be selected on the basis of having to support a slight vacuum.)

The limitation to the action of the rotating spiral-groove as shown in FIG. 2 is that when the pressure of the process-fluid gets too large, the barrier-liquid cannot emerge from the exit-mouth 50 of the groove 45.

Also, if the pressure of the process-fluid is higher than the pressure generated by the groove, the process fluid will tend to enter the interface between the lands 43A and the surface 42, and form its own hydro-dynamic film. This film may then break down, or be blown out, especially if the process-fluid has low viscosity or lubricity.

The smaller the clearance gap between the surfaces 42,43, the higher the pressure it takes to displace the hydro-dynamic film. In the case of cylindrical (i.e not tapered) surfaces 42,43, it is not practically possible to reduce the clearance between those surfaces to below about 0.1 mm, or even more if heavy service is expected.

With a gap like that, and using lubricating oil as the barrier-liquid, it has sometimes been found possible for the spiral-groove to drive liquid into the exit-chamber at pressures measured in many tens of psi, e.g 80 or 100 psi (100 psi=690 kN/m$^2$). Such pressures can be enough to ensure that no leakage of process-fluid can occur, even with the pump dead-headed.

However, when the barrier-liquid has a viscosity less than that of lubricating oil, it is found that only much lower pressures can be supported when the clearance is as large as 0.1 mm. When water, for example, is used as the barrier-liquid, it is found that the pressure in the exit-chamber cannot be made to rise more than about 2 or 3 psi above that in the entry-chamber. This is not enough to guard against the leakage of process-fluid into the spiral groove and into the bearing interface.

In the configuration shown in FIG. 2, the barrier-liquid, upon emerging into the exit-chamber 52, enters the process-fluid. Therefore, in FIG. 2, the barrier-liquid has to be a liquid of a type that can be tolerated in the process-fluid. Although the quantity of the barrier-liquid that enters the process-fluid is small, when compared with the flow rate of the process-fluid being pumped through the pump, in many cases the process-fluid is such that lubricating oil, or other viscous liquid, cannot be allowed to enter the process-fluid even in tiny traces.

In many industrial pump installations, the process-fluid being pumped through the pump is water, or a water-based liquid. Lubricating oil (even small traces thereof) often cannot be tolerated in the water. But, with a clearance between the bearing surfaces as large as 0.1 mm, water itself is almost useless as the barrier-liquid. In order to build up worthwhile pressures in the exit-chamber 52 when water is the barrier-liquid, much smaller clearances than 0.1 mm would be required. But cylindrical surfaces arranged in a male-female bearing configuration, even when made with high precision, cannot, in practice, be run with clearances smaller than that. Cylindrical surfaces may be permissible in the case where traces of lubricating oil can be tolerated in the process-fluid, but that arises in only a very small proportion of pump installations. They are of little use when the barrier-liquid is water.

In FIG. 2, the (plain) stator-sleeve 38 is fixed into the housing, but the rotor-sleeve 36 is free to slide axially on the shaft 29 (though keyed to rotate in unison with the shaft). A spring 65 urges the rotor-sleeve into the taper.

The tapered surfaces 42,43 are lapped together as a matched pair, so that the fit between them is very good over the whole swept interface, or bearing area, of the surfaces.

In FIG. 2, during rotation a hydro-dynamic film establishes itself between the tapered surfaces. The hydro-dynamic film can be as thin or as thick as it requires to be, as dictated by the viscosity of the barrier-liquid, the process pressure, the speed of rotation, the dimensions of the groove, etc. It has been found that even when the barrier-liquid is water, which has only very small viscosity and lubricity characteristics, a film can establish itself between the surfaces 42,43, and a sizeable pressure can be developed in the exit-chamber 52.

In fact, it has been found that pressures of 60 psi, or higher, can easily be achieved in the exit-chamber, with the pump dead-headed, when the barrier-liquid is water. It is also found, during normal rotation, that the hydro-dynamic film is of such robustness that, after long periods of running, there is no evidence of direct contact between the surfaces 42,43.

However, direct touching contact between the surfaces 42,43 cannot be ruled out, and the sleeves should be made of such material as will accommodate occasional touching without seizing, smearing, pick-up, etc. One sleeve may be of cast iron and the other of bronze, for example. Or, plastic bearing materials may be used, such as PTFE.

In fact, even with water, the hydro-dynamic film that establishes itself in the interface between the surfaces 42,43, though very thin, is nevertheless found to be strong enough that the interface may serve as an actual journal bearing for the impeller shaft 29.

FIG. 2 shows a notional bearing 67, which is housed in the bearing box 25, and which is, in a conventional installation, a considerable distance behind the impeller. That is to say, the impeller 34 is mounted on the end of a long overhang of the shaft. As such, the impeller can be susceptible to vibration of a troublesome period and amplitude.

It may be considered that the sleeves 36,38 might serve as a bearing assistant: that is to say, that the bearing formed by the sleeves might serve to assist the bearing 67 by dampening out some of the excessive vibrations. However, it has been found that the bearing 67 can actually be dispensed with in most cases. Even when the barrier-liquid is water, the pump shaft and the impeller are adequately supported by the bearing formed by the sleeves.

One reason for this excellent support is that the bearing is so close to the impeller. In FIG. 2, there need be no provision for a separate stuffing-box-seal, whereby the bearing would have to be spaced from the impeller at least by the width of the seal: in FIG. 2, the stuffing-box-seal and the bearing are one and the same.

Even if the pump cavitates on the intake, any out-of-balance loadings and other abusive vibration-inducing situations that might occur do not cause vibratory excursions of the shaft and impeller, because the bearing is so close to the impeller. The shaft runs smoothly and evenly under conditions that would be expected to cause a conventional pump to shake its stuffing box seal into leakage.

The spiral groove in the tapered sleeve serves to drive the barrier-liquid along the groove from the entry-mouth to the exit-mouth. It will be understood that the distance travelled by the barrier-liquid per turn of the groove will vary because of the taper: the hoop-length of a turn of the groove at the thin end of the taper is less than the hoop-length of a turn at the thick end.

Figure 4:
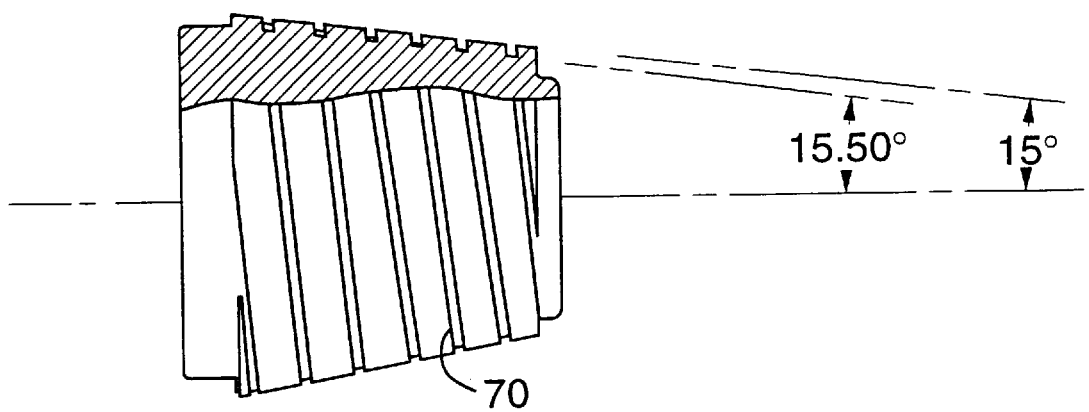
FIG. 4 is a view of a component suitable for use in the apparatus.

To allow for this, the designer should provide that the groove becomes slightly larger in cross-sectional area towards the thin end of the taper, to compensate for the reduced hoop-length. FIG. 4 shows how the groove 70 may be cut slightly more deeply at the thin end.

Figure 3:
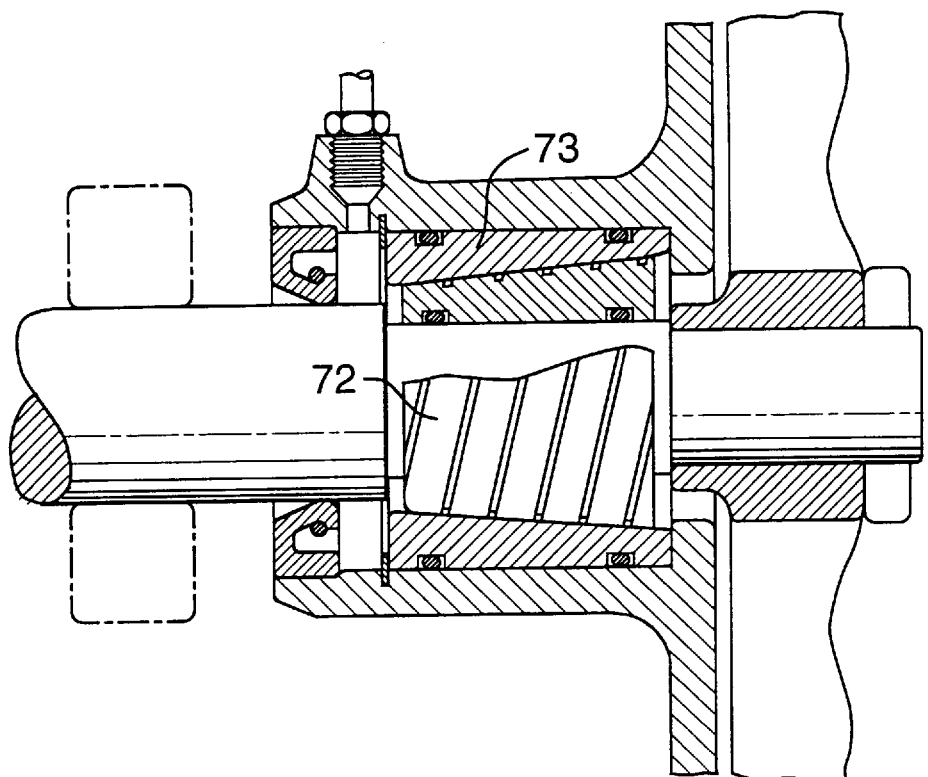
FIG. 3 is a view similar to FIG. 2 of another apparatus.

The sleeves and the groove, and the direction of rotation of the motor, should be set up so that the groove drives the barrier-liquid towards the impeller. In doing so, as shown in FIG. 3, the designer may arrange the sleeves 72,73 to drive the barrier-liquid towards the thick end of the taper. Again, the groove 70 should be a little larger in area (cut a little deeper) at the thin end to make up for the reduction in hoop-length.

In another variation (not shown) the rotor sleeve may be the outer sleeve and the stator the inner sleeve. In that case, the groove would have to be placed on the inside surface of the outer-sleeve, which is much harder to manufacture than putting the groove on an outer surface. However, sometimes, to achieve the best hydro-dynamic effects, the designer may prefer to provide grooves (either spirals or rings) on the inside surface of an outer, stator, sleeve such as sleeve 38 in FIG. 2.

It may be desired to protect the system against leakage of the process-fluid even when the motor should stop rotating. The system of FIG. 2, for example, would allow leakage of the process-fluid back up the spiral groove if the rotation should stop.

Figure 5:
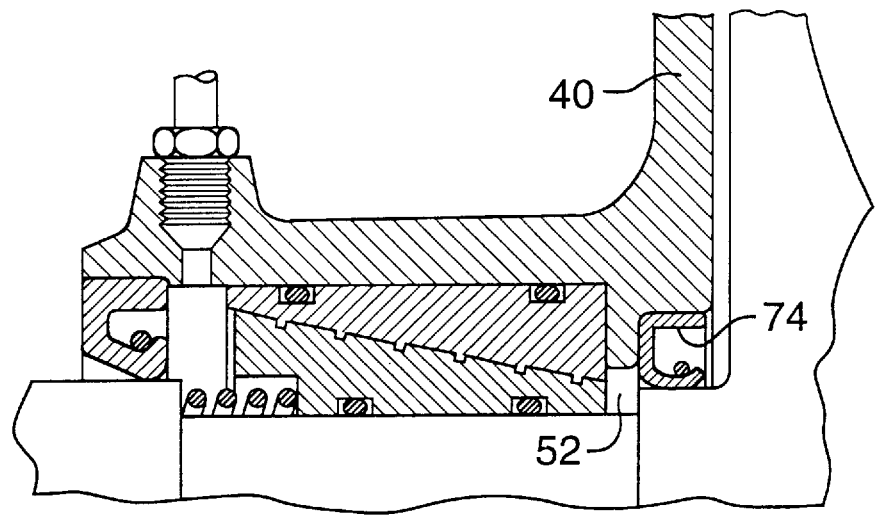
FIG. 5 is a view of another apparatus suitable for use in the installation.

To guard against leakage when the motor is stopped, as shown in FIG. 5, a lip-seal 74 is provided between the exit-chamber 52 and the interior or impeller chamber of the pump housing 40.

During normal running, the pressure developed in the exit-chamber 52 exceeds the pressure developed in the impeller chamber, and the seal-lip is blown open, allowing the barrier-liquid to flow into the impeller chamber. When rotation stops, the now-higher pressure in the impeller chamber forces the lip-seal to close, thus preventing fluid in the impeller chamber from entering the exit-chamber.

Figure 6:
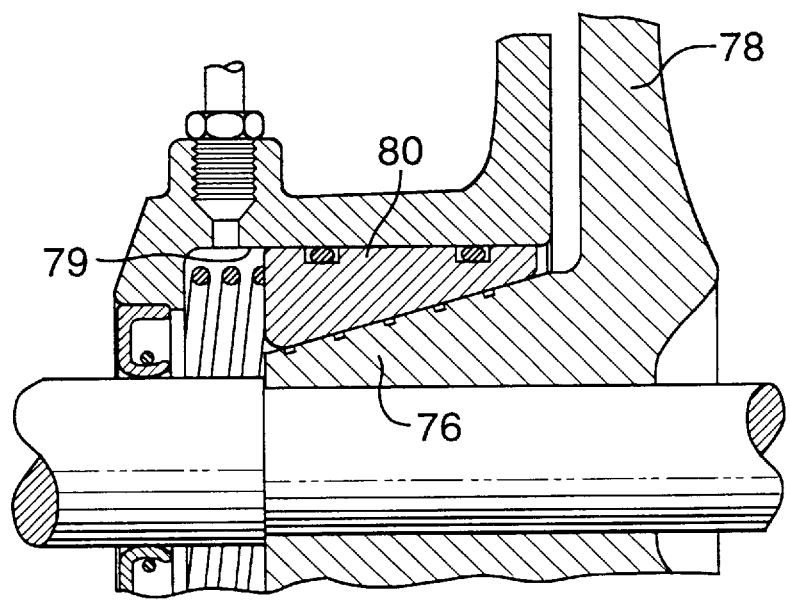
FIG. 6 is a view of another suitable apparatus.

FIG. 6 illustrates another way in which the components can be made. Here, the rotor sleeve 76 is formed unitarily with the impeller 78. The outer, stator, sleeve 80 is spring loaded into the taper. It may be noted that only a simple plain diameter 79 need be provided in the stuffing box housing, without a shoulder at the impeller end.

As an alternative to FIG. 6 (not shown), the stator sleeve may be built into the stuffing box housing. However, the sleeves being tapered, it is not advisable to have both the rotor surface built into the impeller and the stator surface built into the housing, since one of the surfaces must be free to slide axially if the benefit of the taper is to be realised.

In the assemblies illustrated, provided the barrier-liquid has adequate viscosity and lubricity, the set-up can be expected to give a highly reliable seal against all conditions of the process-fluid likely to be encountered in a practical installation. However, it is important to note that if the supply of barrier-liquid should fail, the entry-mouth of the groove will run dry, and then the whole bearing area between the surfaces may run dry, or parts of that area may run dry. If that happens, the pressure in the exit-chamber 52 will fall, perhaps allowing process-fluid to enter the spiral groove and even leak out (to the left) of the stuffing box seals. Once the surfaces run dry, or partly dry, their service lifetime is much reduced.

Therefore, the designer should see to it that the entry-chamber 49 never runs dry of barrier-liquid.

In suitable cases, the barrier-liquid can be taken from the process-fluid. This can be done, of course, if the process-fluid is lubricating oil, but some other types of liquids are suitable also.

It may be considered that where the process-fluid is lubricating oil it would not matter if the entry-chamber 49 (FIG. 2) should run dry, because then the process-fluid would enter the groove 45 from the exit end, and would lubricate the bearing interface. However, if the entry-chamber were to run dry, even when the process-fluid is lubricating oil, the process-fluid could not be expected to reach and to wet the whole swept area of the surfaces, whereby dry-touching of the surfaces could not be ruled out. By ensuring the entry-chamber 49 is kept filled, the designer ensures the hydro-dynamic film is kept intact, and the surfaces do not touch.

Figure 7:
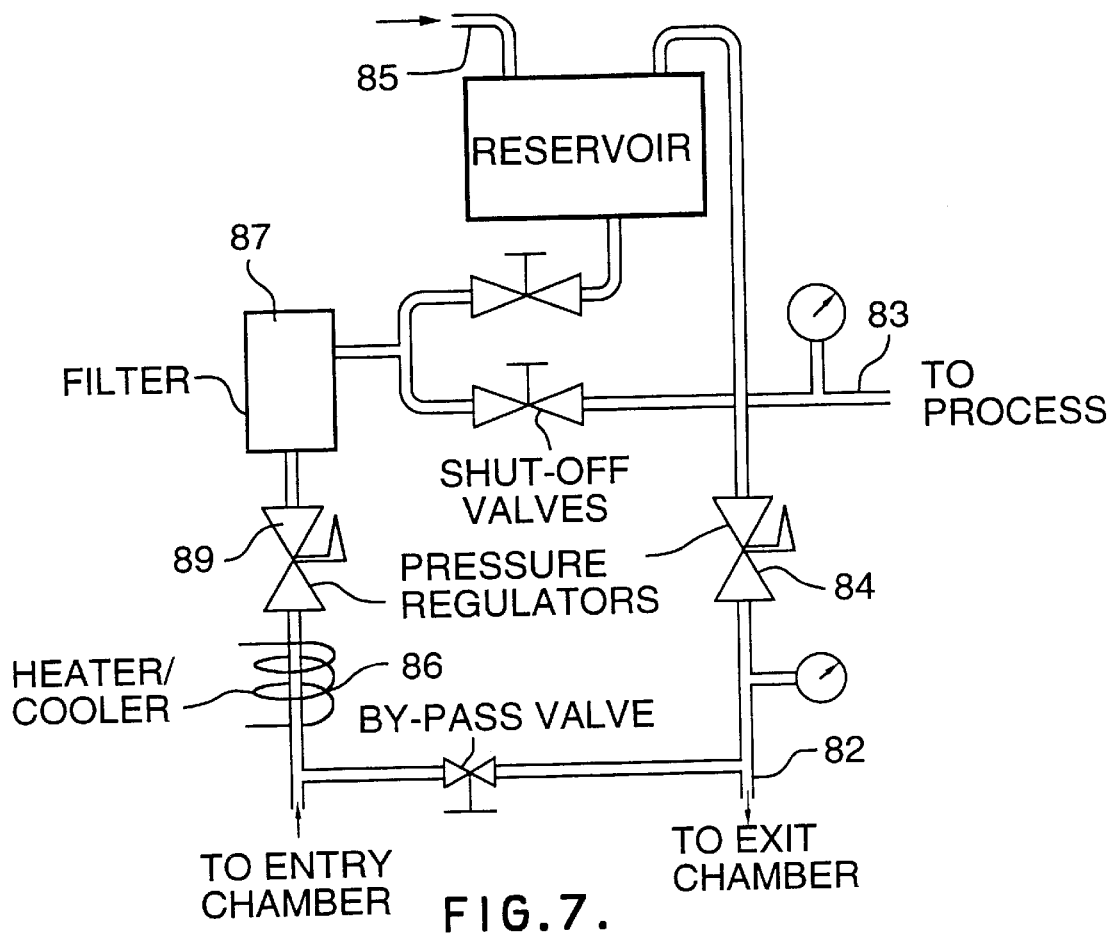
FIG. 7 is a circuit diagram.

FIG. 7 shows a system for ensuring the entry-chamber is kept filled with barrier-liquid. In this case, the barrier-liquid is derived from the process-fluid via pipe 83, and also from a separate supply source 85. The supply is controlled by valves, as shown, which can be manually or automatically controlled, as required.

The barrier-liquid passes through a temperature controller 86 and through a filter 87. It is important that the barrier-liquid be filtered clean, since grains of grit trapped between the bearing surfaces would spoil the self-sustaining character of the hydro-dynamic film.

The pressure of the barrier-liquid in the entry-chamber 49 is controlled by a pressure regulator 89. Alternatively, it may be arranged that pressure in the entry-chamber is controlled by drawing the barrier-liquid from a level of the liquid. The height of the level determines the head or pressure.

It has been the case in the designs described so far that the barrier-liquid can be allowed to leak into the process-fluid, and indeed that the process-fluid is the source of the barrier-liquid. However, although that is the simplest set-up mechanically to arrange, its applicability is not so common. Mostly, it is required that the process fluid not be diluted by the barrier-liquid, and also the process-fluid is not suitable for use as the barrier-liquid.

FIG. 7 also shows means for controlling the barrier-liquid in the case where the barrier-liquid is to be kept separate from the process-fluid. When the two are separate, additives may be added to the barrier-liquid, as desired, especially where the barrier-liquid is water-based, to enhance its properties of viscosity and lubricity. The barrier-liquid is re-circulated by drawing the liquid from the exit-chamber via pipe 82, while maintaining the pressure in the exit-chamber to a desired value by means of regulator 84.

Back-to-back lip-seals may be arranged between the impeller chamber and the exit-chamber, in place of the single lip-seal 74 (FIG. 5). Similarly, back-to-back lip-seals may be positioned at the other end of the tapered sleeves, to seal the entry-chamber 49 (FIG. 2) from leakage both inwards and outwards.

Lip-seals can only support pressure-differences of a few psi. Therefore, it is important to protect the seals from large pressure differentials. This is done by the pressure regulators as shown, preferably automatically. The pressure in the exit-chamber 52 is compared with the pressure in the impeller chamber 49, and the exit-pressure is regulated such that the pressure in the exit-chamber is a few psi more than the pressure in the impeller-chamber. Then, if the seals should fail, the process fluid cannot leak into the stuffing box. In the case where leakage of the process-fluid into the barrier-liquid is less important than leakage of the barrier-liquid into the process-fluid, the pressure differential may be arranged the other way round, i.e the pressure in the exit-chamber 94 is then kept a few psi lower than the pressure in the impeller chamber 92. In the circuit of FIG. 7, the two pressures may be (automatically) compared, and the difference-computation used to regulate, at 84, the pressure in the exit-chamber.

The pressure in the exit-chamber is generated by the action of the spiral-groove (there is no external source of pressure), and of course the designer should see to it that the pressure-generating capability of the spiral-groove is adequate—given the viscosity of the barrier-liquid, the speed of rotation, and the rest of the parameters. If the spiral-groove is only capable of delivering, say, 60 psi, then if the process-pressure might rise to 100 psi (e.g during dead-heading), the seals 90 would fail.

Similarly, lip-seals 49 should not be subjected to more than a few psi, and again a pressure regulator 69 controls the pressure of the entry-chamber. (As mentioned previously, pressure in the entry-chamber may alternatively be controlled by drawing the barrier-liquid from a controlled head level.)

When these precautions are taken, the barrier-liquid circulates around a circuit that is quite separate from the process-fluid. The separated barrier-liquid is filtered, and its temperature and other properties are controlled.

Figure 9:
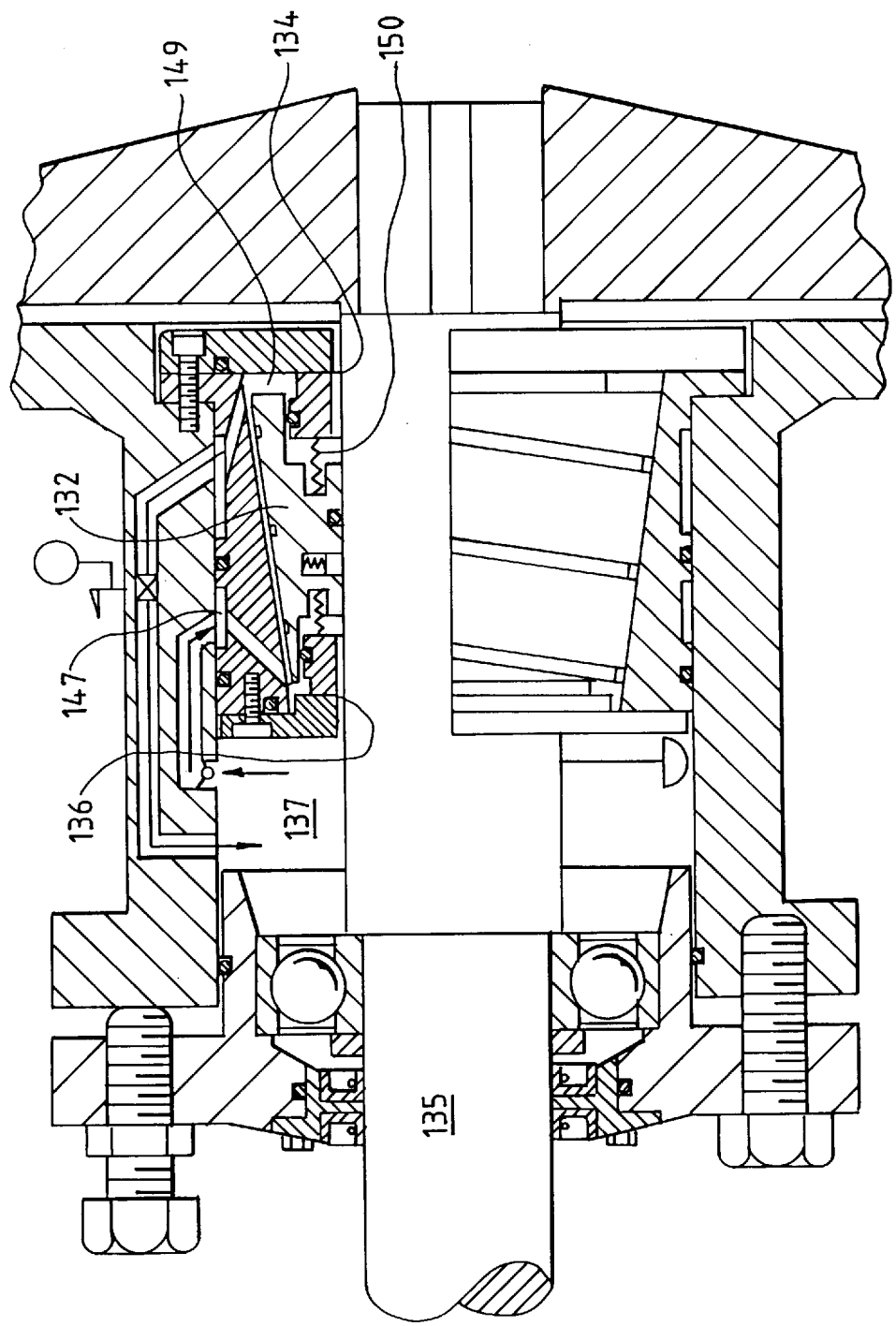
FIG. 9 is a view of another suitable apparatus.

It may be noted that the barrier-liquid derived via pipe 82, and being circulated around the circuit, is the whole of the liquid passing through the spiral-groove. In previous designs where a (pressurised-externally) barrier-liquid has been separately-circulated, the circulation has been on a by-pass basis. In FIG. 9, the whole of the barrier-liquid that passes along the spiral-groove passes into the pipe 82 and is re-circulated.

As mentioned, elastorneric lip-seals can only support a few psi, and, when that is not good enough, or when lip-seals are not suitable for other reasons, mechanical seals may be substituted.

Figure 8:
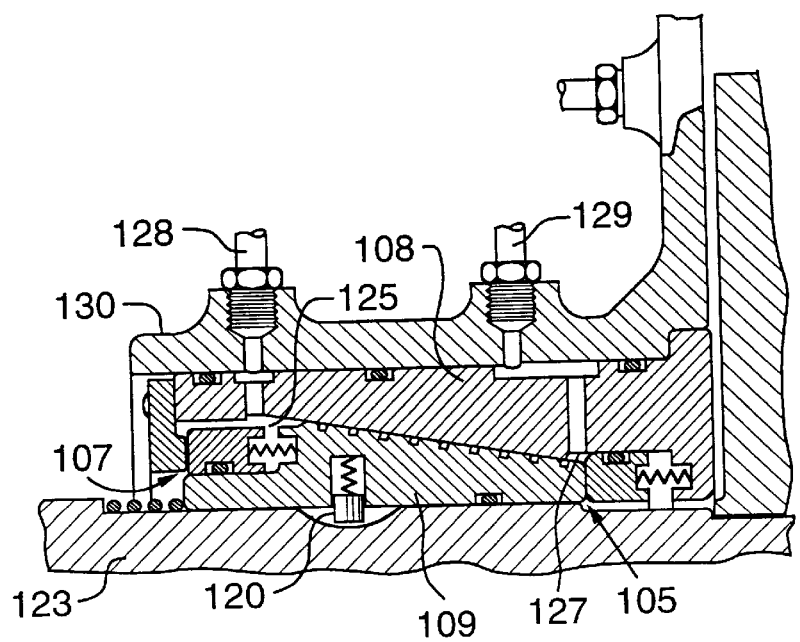
FIG. 8 is a view of another suitable apparatus.

FIG. 8 shows an example of a stuffing-box with two mechanical seals 105,107. The seals are located either end of a matched pair of tapered sleeves 108,109, a spiral-groove being formed on the outer surface of the inner, rotor, sleeve 109. The inner sleeve 109 is keyed at 120 for rotation with a shaft 123, and can slide along the shaft. Entry- and exit-chambers 125,127 are created by the arrangement of the components, and pipes 128,129 convey barrier-liquid through the chambers and through the spiral-groove.

It will be understood that the sleeves and seals as shown in FIG. 8 comprise a cartridge that can be made as a convenient sub-assembly, which is suitable for fitment, as an integrated unit, into a stuffing-box housing 130.

FIG. 9 shows another arrangement that uses mechanical seals. In this case, the tapered interface of the sleeves faces the other way: the extra space inside what is now the thick end of the inner sleeve 132 (i.e the right-hand end in FIG. 9) is used to accommodate one of the mechanical seals 134. This allows the overall length of that seal and the sleeves together to be kept to a minimum. Insofar as the pair of sleeves counts as a journal bearing for the rotating shaft 135, it is important that the overhang of the shaft and impeller, beyond the bearing, be as small as possible. Placing the seal 134 inside the sleeve 132 assists this. It is not so important that the other mechanical seal 136 be short in the axial direction.

As show in FIG. 9, another chamber 137 may be provided outside the entry-chamber 147. The barrier-liquid is used to lubricate the bearings 138 in a bearing box. Often, however, this will not be appropriate, and the arrangement of FIG. 10 would be preferred.

The seal 139 is mounted on a drive-sleeve 140, which is tightened onto the shaft 135 by means of clamp-screws 141. The right-hand end of the drive-sleeve 140 is formed with drive-teeth 142, which engage corresponding drive-slots in the inner sleeve 143.

The matched pair of tapered sleeves and the seal 134 form a first cartridge sub-assembly, which is suitable for fitment into the housing 144; the drive-sleeve 140 and the seal 139 form another cartridge sub-assembly, which is clamped to the shaft 135 and, by means of a cover 145, bolted to the housing 144.

Again, FIG. 7 illustrates the circuit for supplying barrier-liquid to the entry-chamber 147 (FIG. 9) and recovering the barrier-liquid from the exit-chamber 149. As shown, this circuit is passive (i.e no energy input) (except that provision may be made for the liquid to be cooled/heated). It may be arranged that the pressure of the process-fluid is monitored, and compared with the pressure in the exit-chamber, to ensure that the seal 134 is not subjected to an abusive pressure differential.

It may be noted that the circulation of barrier-liquid between the sleeves and through the entry- and exit-chambers, serves also to flush the mechanical bearings of any dirt and debris that might build up in the chambers. Conventional mechanical seals are often provided with flush and drain facilities to clean out debris: such facilities are present automatically in the present case without the need for supplied energy, and virtually for nothing.

Figure 10:
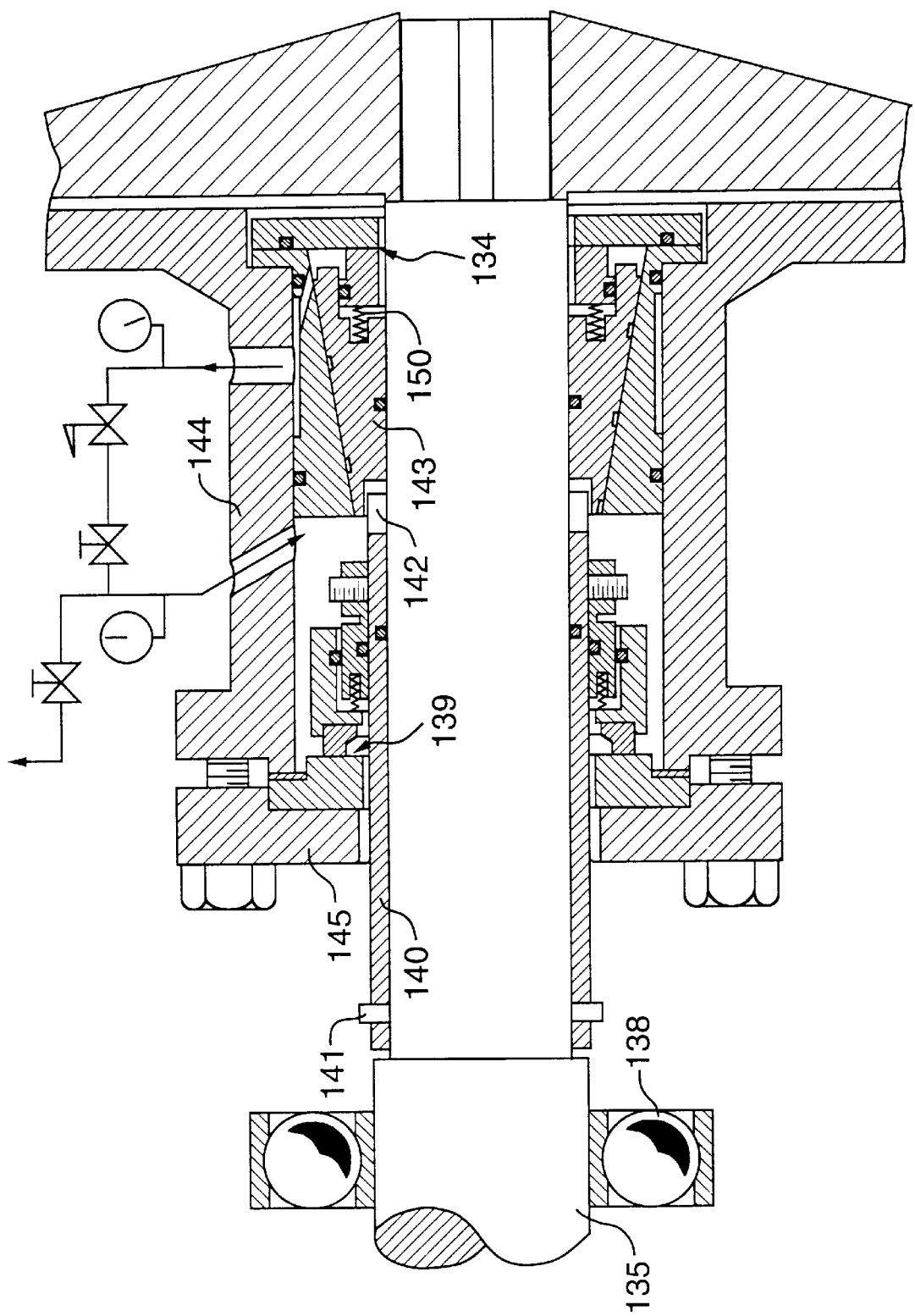
FIG. 10 is a view of another suitable apparatus.

It may be noted that the inner sleeve 132;143 (FIG. 9; FIG. 10) is free to slide axially on the shaft 135, and that the spring 150 (FIG. 10) urges the inner sleeve to the left, i.e more deeply into the taper. However, the characteristics of the spring 150 are selected primarily on the basis of the requirements of the mechanical seal 134. It might be considered that the force with which the tapered sleeves are pushed together would need to be tightly controlled between close limits. However, this is not the case. The hydrodynamic film that forms between the tapered surfaces is very robust. Once the film is established between the surfaces, an increase in the force urging the surfaces together has little effect in making the surfaces actually move towards each other, while the force required to physically break through the film and close the surfaces together into touching contact is considerable. Thus, the film-filled gap between the tapered surfaces is self-setting and self-sustaining to a large extent, even though the force pushing the surfaces together may vary, or may be set by the requirements of the mechanical seals.

The axially-movable sleeve 132 is subject to the pressure in the exit-chamber 149, which, like the spring 150, serves also to urge the sleeve 132 more deeply into the taper.

It has been mentioned that the pair of sleeves with the spiral groove serves as a journal bearing for the impeller shaft. In the case of conventional stuffing-box-type pumps, when the requirements of the shaft bearings (located in the bearing box 25) were being determined, one of the key factors in the computations was the length of the overhang by which the impeller extended out beyond the bearing. This overhang determined the period and amplitude of vibrations that might be encountered, and which the bearing had to contain. In the present case, however, this overhang is virtually zero (less than a diameter of the shaft). Therefore, when the shaft bearing is formed by sleeves located very close to the impeller, the loading on the bearing is considerably less than the loading normally encountered with pump-bearings that have to cater for overhanging shafts.

Thus, the new design not only eliminates the need for a bearing box (such as 25), along with its need for lubrication etc, but the new design puts considerably less loading and usage demands on the bearing itself.

Given that in conventional designs the nearest bearing to the impeller can be, typically, 15 or 20 cm away from the impeller, it is not difficult, with the present design, to make a large improvement. The designer should space the bearing interface surfaces axially along the shaft preferably within no more than about 1 diameter of the shaft, from the impeller.

Naturally, the designer should see to it that provision is made for axial thrust forces on the pump shaft to be supported, and it will often be convenient to provide a thrust bearing outside the pump housing, and between the pump housing and the coupling (such as 30) for that purpose. (Couplings usually cannot transmit axial forces.)

Figure 11:
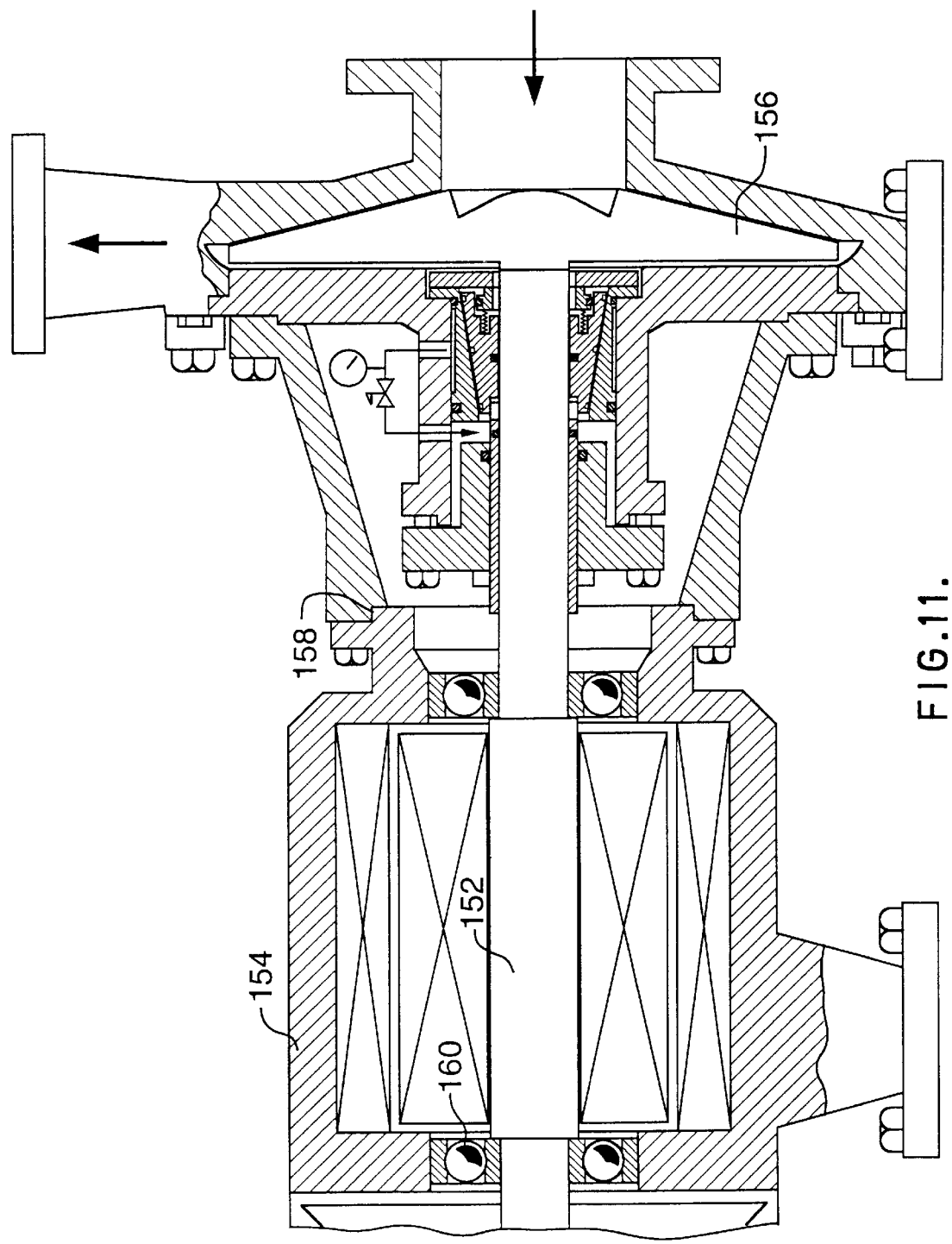
FIG. 11 is a view of an apparatus, shown installed with other structures.

FIG. 11 shows an arrangement in which not only is the bearing box 25 eliminated, but also eliminated is the coupling 30 between the motor shaft and the pump shaft. The shaft 152 serves both as the armature of the electric motor 154 and the drive shaft of the pump impeller 156. The housing of the pump and the housing of the motor may be bolted together as one unit, the accurately-machined spigots at 158 serving to ensure alignment. Because there is no coupling, axial thrust forces on the shaft may be supported by a thrust bearing 160 actually in the motor housing.

Figure 12:
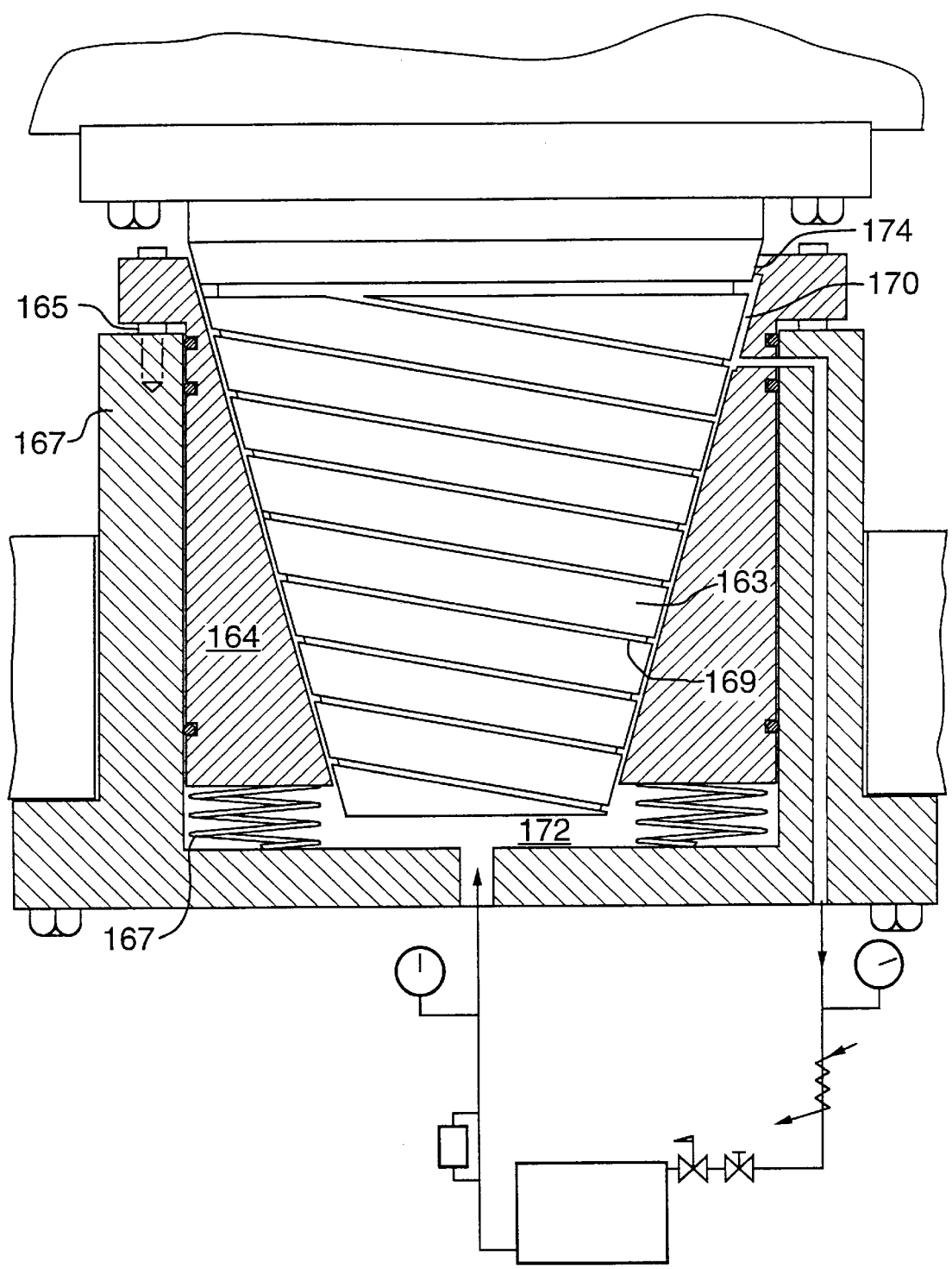
FIG. 12 is a view of another type of apparatus.

FIG. 12 shows a matched pair of tapered sleeves arranged in a seal/bearing configuration, where there is no through-shaft. The rotor 163 is formed as a stub.

The outer sleeve 164 is keyed at 165 to the stationary housing 167. The outer sleeve can float axially (vertically) within the housing, and is pressed upwards by springs 167.

The tapered surface of the rotor sleeve 163 is provided with a spiral-groove 169. By the action of the spiral-groove, when the sleeve 163 is rotated, barrier-liquid supplied to the entry-chamber 170 is forced down to the exit-chamber 172, and a hydro-dynamic lubrication film is established between the tapered surfaces.

The upper end of the entry-chamber 170 is sealed by a sealing interface 174 between the rotor and the stator sleeves. There is very little pressure on this sealing interface since liquid in the entry-chamber 170 is being drawn into the entry-mouth of the spiral-groove 169.

Figure 13:
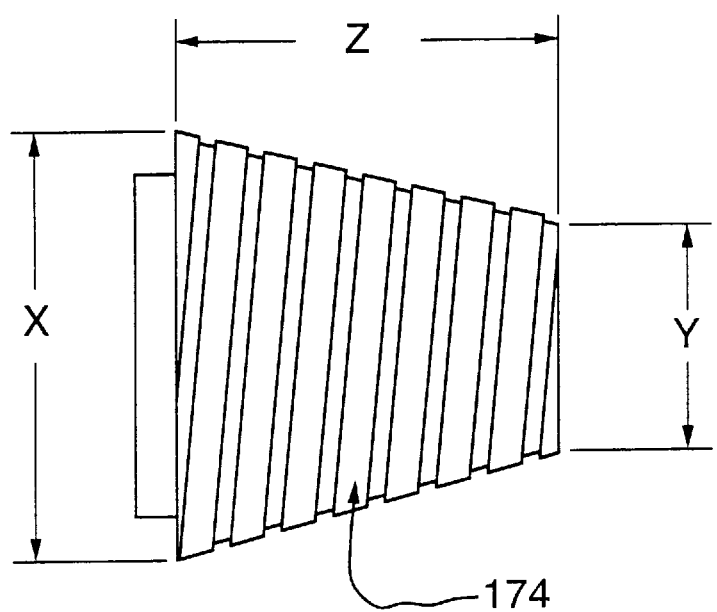
FIG. 13 is a view of another component suitable for use in the apparatus.

FIG. 13 shows a rotor sleeve 174 of the type used in the designs as described. In tests on sleeves, the following performances were noted.

Male-tapered Sleeve No 1 (running in a plain female sleeve):
  included angle of taper=20 degrees;
  diameter x=47.6 mm;
  diameter y=31.8 mm
  length z=44.4 mm;
  spiral groove=single-start, cut 2.03 mm wide ×0.20 mm deep; groove
  pitch groove=6.35 mm turn-to-turn;
  width of land between turns=4.32 mm Test 1:
  liquid=water at 18 deg C. (viscosity=1.15 centi-stokes)
  speed of rotation=1750 rpm;
    Result: generated pressure=70 psi,
      flow rate=2.2 litres/hr Test 2:
  liquid=water at 18 deg C.
  speed of rotation=3500 rpm;
    Result: generated pressure=100 psi,
      flow rate=4.5 litres/hr Test 3:
  liquid=water at 18 deg C.
  speed of rotation=1100 rpm;
    Result: generated pressure=40 psi,
      flow rate=1.5 litres/hr Test 4:
  liquid=SAE 30 min. oil at 18 deg C., viscosity 50 c-stokes
  speed of rotation=1750 rpm;
    Result: generated pressure=300 psi
      flow rate=3.0 litres per hour.

Sleeve no 2 (same as sleeve no 1, except that length z reduced to 38.0 mm by machining off the thin end) (running in plain female sleeve).

Test 5:
  liquid=water at 18 deg C.
  speed of rotation=1750 rpm;
    Result: generated pressure=60 psi.

Sleeve no 3 (same as sleeve no 1, except that length z reduced to 31.6 mm by machining off the thin end) (running in plain female sleeve).

Test 6:
  liquid=water at 18 deg C.
  speed of rotation=1750 rpm;
    Result: generated pressure=50 psi.

Sleeve No 4 (same as sleeve no 1 except that two grooves are cut, each pitched 12.7 mm, width of land between adjacent turns=4.32mm) (running in a plain female sleeve):

Test 7:
  liquid=water at 18 deg C.
  speed of rotation=1750 rpm;
    Result: generated pressure=32 psi,
      flow rate=5.4 litres/hr Test 8:
  liquid=water at 93 deg C. (viscosity=1.13 centi-stokes)
  speed of rotation=1750 rpm;
    Result: generated pressure=64 psi Sleeve No 5 (same as sleeve no 1, single groove, except that groove depth increased to 0.25 mm deep) (running in a plain female sleeve):

Test 9:
  liquid=water at 18 deg C.
  speed of rotation=1750 rpm;
    Result: generated pressure=60 psi,
      flow rate=3.0 litres/hr Sleeve No 6 (same as sleeve no 1, single groove, except that groove depth increased to 0.30 mm deep) (running in a plain female sleeve):

Test 10:
  liquid=water at 18 deg C.
  speed of rotation=1750 rpm;
    Result: generated pressure=45 psi,
      flow rate=4.5 litres/hr Sleeve No 7 (same as sleeve no 1, single groove, except that groove depth increased to 0.35 mm deep) (running in a plain female sleeve):

Test 11:
  liquid=water at 18 deg C.
  speed of rotation=1750 rpm;
    Result: generated pressure=20 psi,
      flow rate=6.7 litres/hr Test 12:
  liquid=molasses at 18 deg C.
  speed of rotation=1750 rpm;
    Result: generated pressure=500+>psi, Tests 1,2,3 show the extent to which increased speed of rotation results in both more pressure and more flow from the spiral-groove.

Test 4 compared with Test 1 shows the much greater pressure available when oil is used as the liquid, in place of water.

Tests 5,6 compared with Test 1: each 6.4 mm reduction in length shows a 10 psi fall in pressure availability.

Test 7 compared with Test 1 shows that the pressure is halved and the flow rate is doubled when two grooves are present, as compared with one groove.

Test 8 shows that when the water isa almost boiling there is roughly 8% drop of pressure capability.

Tests 9,10,11 show the drop-off in pressure as the spiral groove is cut deeper. When the liquid is water, a groove depth of more than about 0.50 mm generates hardly any pressure at all.

Test 12 shows that when the liquid is molasses, a groove depth of 0.50 mm produced more than 500 psi. With molasses, however, little impression was made on the molasses when the grooves were less than 0.30 mm deep.

The tests also showed that viscous liquids such as oil were much more tolerant of changes in speed, grove-depth, etc, than water. Nevertheless, it is clear that the groove as described has a high performance in producing pressure and volume flow, even when the liquid is water.

In most cases, the requirement, when creating a pressure in the barrier-liquid in the stuffing-box, is that a high pressure be achieved. In fact, often, the requirement is that the barrier-liquid be at a higher pressure than the process-fluid.

Theoretically, there would be no need for a high volumetric flow-rate, so long as the pressure is generated. In fact, it can be said that a high flow-rate would be a disadvantage, especially if the flow leaks through into the process-fluid.

However, it is important, when creating a pressure in the barrier-liquid in the stuffing-box, that the means for creating the pressure is robust enough to be able to create that pressure even though the barrier-liquid is circulating vigorously through the stuffing-box, and even though the stuffing-box seals may be leaking.

In this connection, the attempts to create pressure by using the scroll markings as shown in U.S. Pat. No. 4,290,611, may be reviewed. These scroll markings may have a potential to generate pressure, but only if the flow is at the zero or mere-trace level. Pressure is created only while there is no leakage. What can happen is, once a measurable magnitude of leakage starts to appear at the seal, for whatever reason, the pressure-generating capability plummets, and the seal immediately opens and permits copious leakage.

That is not what is wanted. The mechanism for creating the pressure should be versatile and robust enough to maintain the barrier-liquid pressure, even though the seals may be leaking. It is of little practical use if the process-fluid can burst straight through into the stuffing-box as soon as a tiny leak starts to develop in the seal between the process-fluid and the stuffing-box.

In the designs as described, this desired degree of flexible robustness of pressure-generation can be obtained. Provided the parameters of groove size, etc, are properly tailored to the speed of rotation and the viscosity of the barrier-liquid, the barrier-liquid will force its way out inexorably and continuously from the exit-mouth of the spiral-groove.

It is, in most cases of centrifugal pump installations, simple enough for the designer to ensure that enough pressure is available from the spiral-groove to overcome any pressure that might be present in the process-fluid, and to do so even when the spiral-groove is producing flow rates, of the magnitude of a few litres per hour.

It has been found that this level of performance can be achieved even though the barrier-liquid is water.

The designer should make the spiral-groove to the right dimensions to achieve the desired pressure and flow.

The groove should not be cut deeper than about 0.4 mm, given that its width is around 2 mm. In general, the total or aggregate cross-sectional area of the spiral-groove(s) should not be more than about 1 sq mm, and preferably should be no more than about 0.5 sq mm.

The groove should not be too small. A small groove might still be able to produce the pressure, but would not be capable of delivering adequate volumetric flow-rate at that pressure. A groove cross-sectional area of about 0.3 sq mm is a minimum below which the flow-rate of barrier-liquid would be inadequate for most cases.

That is for water: the groove may be around twice the area when the liquid is oil.

It may be noted that the spiral-groove as described can provide not only high pressure but can at the same time provide a good flow rate at that pressure. This has not previously been achieved in a pump stuffing box situation.

The volume of one turn of the groove is tyically about 0.06 millilitres: it may be calculated that, when liquid flows from the exit mouth of the groove at the rate of 3 litres per hour (as typically occurs), this corresponds to a delivery of about 0.03 milli-litres of liquid per revolution, or about half the volume of one turn of the groove per revolution.

The total length of the groove between entry-mouth and exit-mouth is typically at least 50 or 70 cm. 30 cm should be regarded as the minimum. If the total length of the groove is too short, pressure cannot be developed.

A key factor in the use of the invention lies in the establishment of the hydrodynamic film between the surfaces. The running clearance or gap between the surfaces should be small enough, and the lands between adjacent turns of the spiral-groove should be wide enough, to ensure that the film is robust and secure. A land-width of 4 mm between turns has been found satisfactory. 2 mm should be regarded as a minimum.

As described herein, when the surfaces are tapered, and one of the tapered surfaces is formed on a sleeve that moves axially, the designer can take it that the surface-to-surface gap, which determines the film thickness, can be very small. The smaller the gap, and the wider the land, the greater the pressure difference that can be supported between the turns of the groove.

The longer the spiral-groove, the greater the final pressure that can be achieved. It will be noted also that, the longer the groove, the more the groove resists back-leakage, and the larger the groove can be as to its cross-sectional area, without compromising the pressure at the exit-mouth, and hence the more volume can be moved along the groove.

It is recognised that the dimensional envelope of a typical stuffing box installation is such that the size of spiral-groove that can readily be accommodated therein can produce a more-than-adequate combination of pressure and volumetric flow rate through the groove.

The configuration of the spiral-groove means that even if the mechanical seals should fail, and even if the motor should stop rotating, fluid can only leak through the groove at a very low flow-rate. The groove may be 1 sq mm in area and 50 cm long, through which leakage will inevitably be slow.

As mentioned, sometimes the designer must provide that no leakage of process-fluid can occur, even if the mechanical seal between the exit-chamber and the impeller-chamber should fail (assuming the motor keeps running). In this case, the designer should provide for the pressure in the exit-chamber to be regulated to a pressure slightly higher than the pressure in the impeller-chamber. The pressure-regulators are provided outside the stuffing-box housing, and coupled to the chambers by pipes, as described.

Preferably, the engineer should provide for the automatic regulation of the pressure in the exit-chamber to a value that is just higher than the pressure of the process-fluid in the impeller chamber. The engineer thereby ensures that, if the seal should leak, barrier-liquid will flow from the exit-chamber into the impeller chamber, rather than that process-fluid will flow from the impeller chamber into the exit-chamber. So long as the pressure in the exit-chamber is kept higher than the pressure of the process-liquid, the process-liquid cannot leak into the exit-chamber, and thence to the outside.

The engineer may decide, alternatively, to regulate the pressure in the exit-chamber to a smaller pressure than the pressure in the impeller chamber, if that is more appropriate. The main point about setting the pressures is that the pressure in the exit-chamber should be set to a value which does not differ by very much, whether higher or lower, from the pressure in the impeller chamber.

Similarly, the designer can provide that the pressure differential is also kept small, across the mechanical seal between the entry-chamber and the outside. The brunt of the total pressure differential between the process fluid and the atmosphere is then taken by the spiral-groove which runs between the entry-chamber and the exit-chamber. That is to say, the spiral-groove is used to keep the pressure-differentials across the seals to a minimum. The smaller the pressure differential across a mechanical-rub type seal, the longer the life expectancy of the seal.

The engineer may regulate the pressure in the exit-chamber to a level that is just below, or just above, process-pressure. Although the process-fluid pressure may then be high, the differential on the mechanical seal is low. This of course is good for the mechanical seal, but also, the fact that the pressure in the exit-chamber is high means that the interface pressure between the tapered surfaces is also high, which is good for the surfaces as a running bearing interface.

When the pressure of the process-fluid is high, i.e more than a few psi, even though the differential pressure on the seal may be low, the prudent engineer prefers that the seal to the process-chamber should be of the mechanical type, not the elastomeric lip type. On the other hand, the seal between the entry-chamber and the outside environment can often be safely provided as an elastomeric lip type. Mechanical seals are generally much more expensive than elastomeric lip seals.

The designer should see to it that the supply of barrier-liquid to the entry-mouth of the groove does not run dry. However, this is not too demanding a requirement in the normal industrial pump environment. Besides, the supply side of barrier-liquid need not be pressurised, since the spiral-groove will draw barrier-liquid in from a (slight) vacuum (negative head) if necessary.

The barrier-liquid should be kept clean. If dirt were to appear between the tapered surfaces, that could affect the ability of the hydro-dynamic film to maintain the correct gap between the surfaces. However, it should be pointed out that, in tests, the spiral-groove in the tapered surfaces actually in itself served to clean particles of grit from the surfaces.

It may be surmised that the reason for this self-cleaning capability is that dirt particles tend to congregate, not within the hydrodynamic film, but rather in the spiral-groove. The velocity of liquid moving along the groove then tends to flush the dirt to the exit end of the groove. The lands between the turns of the spiral-groove are narrow enough that the liquid in the films, in the lands, is able to wash into the grooves. The lands should not be more than about 8 mm wide, from this standpoint.

Selection of the materials form which the rotor and stator sleeves are made is important. This is true even though, once the hydrodynamic film is established there is theoretically no contact between the surfaces, because occasional touching contact is inevitable.

The component having the surface in which the spiral-groove is cut should be of a harder material than that on which the plain surface is formed. Then, if any wear should then occur, it is the plain surface that will be eroded, leaving the groove intact. In fact, a little wear is beneficial, insofar as it produces buffing of the surfaces, and enhances their intimacy of fit.

Suitable combinations are that the grooved, male, rotor be of stainless steel, coated with about 0.1 mm of hard chrome, or a ceramic bearing material. (Stainless steel without a coating would not be suitable, as it tends to smear.) The plain, female, stator may be of carbon (graphite), PTFE, or one of the (many) composite materials developed for prolonged running in contact with hard metal.

The designer has to provide some means for urging the tapered surfaces together. This may take the form of a mechanical spring, or provision may be made for the barrier-liquid pressure, or the process-fluid pressure, to act on the axially-movable sleeve in such a way as to urge the surfaces together. (If no axial-constraint at all were provided, the surfaces would just move apart, and the hydro-dynamic film could not develop.)

In assessing just how that is to be done, the designer should take note of which is most important: leakage of barrier-liquid into process fluid, or leakage of process-fluid into barrier-liquid. When pumping a drinkable liquid, for example, it is important that the drinkable liquid be free of traces of the barrier-liquid, but the drinkable liquid is not toxic and so it does not matter so much if a little of the drinkable liquid leaks out through the stuffing-box. In another case, the process-fluid may be a toxic liquid, or one that is carcinogenic in tiny traces, and in that case dilution of the toxic liquid by the barrier-liquid is preferable to leakage of the toxic liquid into and through the stuffing-box.

The designer may arrange that the pressure of the process fluid is the main agent for forcing the tapered surfaces together, or the pressure of the barrier-liquid. Or, the components may be arranged so that the movable sleeve is neutral to one of, or both, pressures, and its axial force is determined by a mechanical spring. Or, some suitable combination of pressure-exposures and mechanical springs may be provided.

As the pressure of the barrier-fluid increases, the hydro-dynamic film increases its tendency to drive the tapered surfaces apart. Therefore, it is generally preferable for the axially-movable sleeve to be urged more strongly into the taper as the process pressure increases.

If there were too little resistance to the movable sleeve moving away, the pressure could not build up properly. Therefore, the designer should provide that the axial forces acting on the movable sleeve are large enough to hold the tapered surfaces together to allow the desired pressures to be achieved.

It does not matter so much if the tapered surfaces are pressed together more tightly than is necessary, because the hydrodynamic film is very robust. On the other hand, the sleeves should not be pressed together so hard that the film actually breaks down, and allows the tapered surfaces to touch mechanically. Even if the surfaces could, in such a case, tolerate being run together, tests show that forced contact between the surfaces causes a drop in the pressure in the exit-chamber.

The angle of the taper should be neither too large nor too small. The steeper the angle, the more force is required to hold the tapered surfaces together, to allow pressure to develop. The angle becomes too steep when the force needed to hold the sleeves together is too large to be conveniently provided, or conveniently controlled.

Another problem arises when the taper angle is too steep. Inasmuch as the tapered sleeves are serving as a journal bearing for the impeller shaft, a journal load on the tapered surfaces naturally induces an axial loading between the surfaces. This induced axial force tends to drive the movable sleeve out of the taper. The steeper the taper angle, the greater the induced axial loading on the movable sleeve. If the angle were too steep, it may then happen that such means as are provided to resist the axial movement of the movable sleeve would compromise the movable sleeve's ability to settle itself into the most favourable position for the hydro-dynamic film to develop. However, provided the taper angle is not steep, the induced axial forces on the movable sleeve, due to the sleeves' serving as a journal bearing, may be ignored.

It is pointed out again that, because the overhang of the impeller beyond the sleeves is so small, the journal bearing loads are also small. Journal loads on impellers can also be reduced by balancing the process-fluid outlets from the pump chamber. When the main journal loads were caused by vibrations due to the long overhang, it was often not worth it to balance the outlet pressures, but when the bearing is very close to the impeller, the journal forces, both from output imbalance and from vibration, can be reduced to very small levels.

Based on the above considerations, a taper angle of between 10 and 30 degrees inclusive (i.e between 5 and 15 degrees half-angle) has been found to give good results, with 20 degrees as the preferred value.

The maximum included angle that could be made to work properly according to the invention is about 60 degrees. Above that, the axial forces induced on the movable sleeve cannot be properly controlled.

The taper angle should not, on the other hand, be too small. If the included angle of the taper is too small, manufacture of the tapered surfaces, by lapping them together, can become difficult, because the surfaces may tend to Lock up. Also, if the tapered surfaces should become dry, and the coefficient of friction between them thereby increases, lock-up may again occur. Therefore, preferably the angle of the taper should not be less than the self-locking angle. The self-locking angle may be determined from the coefficient of friction between the two sleeves. For metals like cast-iron and bronze, the included angle should not be less than about 7 degrees.

In the designs as described, the spiral-groove has been formed on the rotor sleeve, not on the stator sleeve, and this is preferred. It is also preferred that the rotor sleeve be the male sleeve, since then the groove is cut on an outwards-facing surface; the inside-facing surface of the female sleeve is left plain.

It is contemplated that the spiral-groove may be formed on the tapered surface of the stator, leaving plain the tapered surface of the rotor. It is also contemplated that grooves may be cut on both the rotor and the stator.

In the invention, the hydrodynamic film should be robust and secure. Unless the liquid is very lubricious and viscous, the preference would be for the groove to be cut in only one of the surfaces, while the other is left plain. Preferably it is the surface in the stator that is left plain, and preferably it is the female surface that is left plain. If grooves are cut in both surfaces, that might tend to break up the film. However, in cases where the barrier-liquid is, or might be, dirty, and the liquid is adequately viscous and oily, grooves on both surfaces may be preferred.

Figure 14:
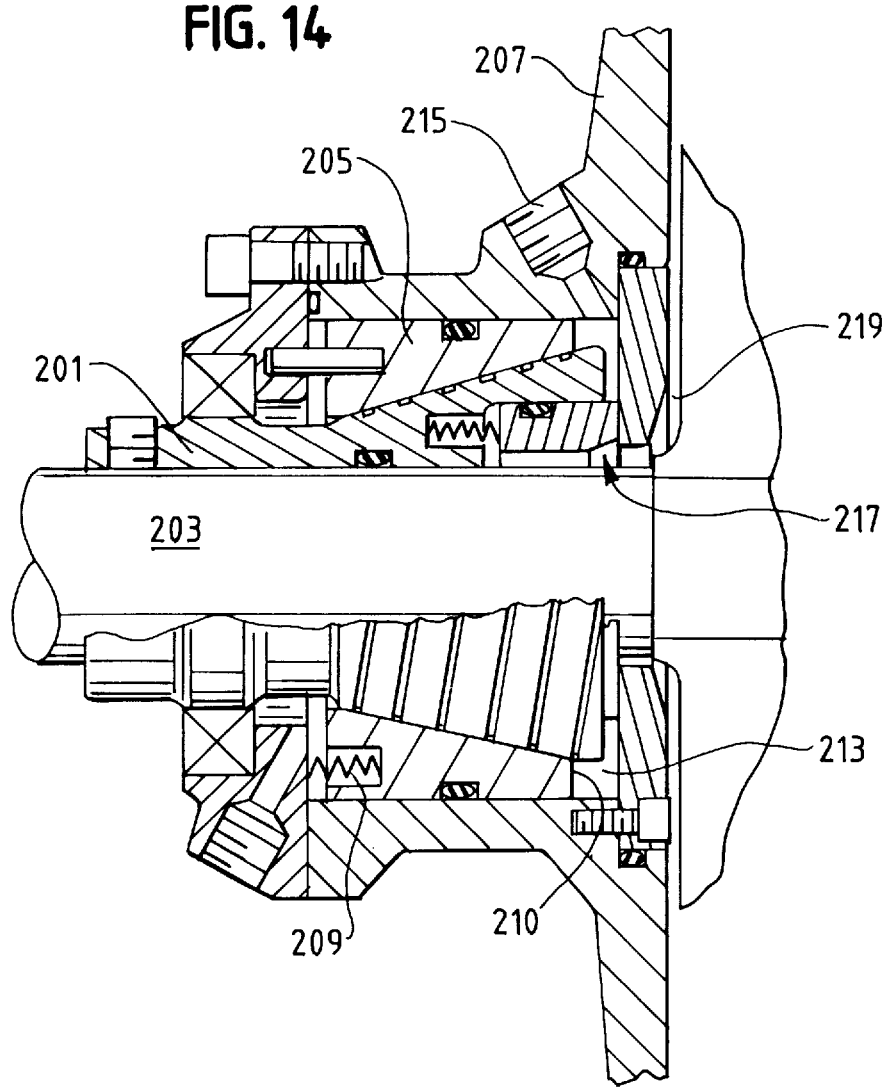
FIG. 14 is a cross-section of another seal assembly for an impeller pump that embodies the invention.

In the embodiment as shown in FIG. 14, the rotor sleeve 201 is fixed rigidly to the shaft 203, and the stator sleeve 205 is mounted for axial sliding within the housing 207. Springs 209 load the stator sleeve to the right, thereby exerting a force between the male and female tapered sleeves 201,205 tending to urge the taper more tightly together.

The end face 210 of the movable stator sleeve 205 is exposed to pressure developed in the exit chamber 213. This pressure therefore tends to urge the two tapered sleeves apart. However, if the sleeves were indeed to move apart (i.e if the stator sleeve 205 were to move to the left), the pressure in the exit chamber 213 would fall; the spring 209 would then urge the stator sleeve to the right. Thereby, an equilibrium balance is created between the force of the spring 209 urging the stator sleeve to the right, and the pressure in the exit chamber urging the stator sleeve to the left.

As a result of this equilibrium, during operation the tapered sleeves settle down to an optimum separation, in which just enough pressure is generated by the action of the spiral groove to balance the force of the spring 209, and the hydrodynamic film between the tapered interfaces is maintained at an optimum thickness to achieve this balance.

In some installations, the FIG. 14 arrangement can make for very favourable operating conditions, in which the drag on the shaft attributable to film friction and to contact between the sleeves may be regarded as practically zero. Thus, the seal assembly comprised of the spiral-grooved tapered sleeves generates hardly any more friction than if the space it occupies were left open.

In some cases, in such installations, the barrier liquid circulation can become very small, as a volumetric flow rate of liquid, because the barrier liquid, in travelling along the groove can leak back into the hydrodynamic film as the taper is eased apart by the liquid pressure. In some cases, the port 215 for conveying the barrier liquid away from the exit chamber 213 can even be closed. It might be considered that the barrier liquid would become hot if it were not allowed to circulate (and if the liquid does tend to become hot circulation should be provided for) but the heat generated by the tapered interface may be so small that the heat is easily dissipated naturally from the housing 207.

The FIG. 14 arrangement is particularly suitable in an installation where the process pressure remains more or less constant. That being so, the springs 209 can be chosen to balance the leftwards force on the stator sleeve when the pressure of the barrier liquid in the exit chamber is slightly below the process pressure. The mechanical seal 217 between the exit chamber 213 and the process chamber 219 therefore "sees" only a small pressure differential, which makes for a good service life of the mechanical seal. If the process pressure were to vary, however, theoretically (if it were practical) the force due to the springs 209 should be varied in a complementary manner. In a case where the spring force remains constant, but the process pressure varies, the pressure differential on the mechanical seal consequently also varies.

The FIG. 14 arrangement may be regarded as acting like a pressure relief valve. If the pressure in the exit chamber 213 were to rise, the stator sleeve 205 backs off (i.e moves to the left), against the spring 209, thus easing the tapered interfaces apart slightly, and relieving the pressure. This would not be the case in the arrangement shown in FIG. 10, for example. In FIG. 10, the sleeve that moves axially is the rotor sleeve, which can slide axially along the shaft. In FIG. 10, pressure in the exit chamber urges the rotor sleeve to the left, thereby urging the tapered surfaces more tightly together, not apart as in FIG. 14. In the FIG. 10 type of installation, therefore, as the pressure in the exit chamber increases, the force acting to drive the tapered surfaces together consequently increases; this subjects the hydrodynamic film to more pressure, whereby the effect is to cause the exit chamber pressure to increase further. Therefore, in FIG. 10, if the pressure in the exit chamber is able to increase, it will in fact do so—up to the limit of pressure that can be generated by the spiral groove. The pressure that can build up in the exit chamber may be limited, however, for example by having the exit chamber open to the process fluid (as in e.g FIGS. 2,3,6) or, it the exit chamber is sealed from the process fluid (as in FIG. 10), by subjecting the exit chamber to outside pressure regulation, as shown in FIG. 10.

In FIG. 14, the pressure in the exit chamber 213 is limited by the springs 209, which allow the sleeves to ease apart (slightly) if the pressure in the exit chamber should rises. Of course, the designer may arrange for outside regulation of pressure, if desired, but only up to the level of pressure as set by the springs 209.

In many pump installations, cavitation in the process intake pipe is a problem if the pump has mechanical seals, because cavitation can cause the pump to shake and vibrate. It can happen that the impeller shaft shakes so much, during cavitation, that the mechanical seal faces are shaken apart. Experience shows that once parted, the faces rarely re-seal effectively. The vibration of the shaft is exacerbated because the impeller on the shaft overhangs the shaft bearings by a considerable distance, and so the amplitude of the vibration of the impeller is large.

In the systems as described herein, on the other hand, the tapered sleeves, with their intimate contact, act to stabilise the shaft, particularly because the sleeves are located very close to the impeller. The sleeves serve to constrain the amplitude of any shaking that might tend to arise, whereby, if cavitation in the process intake should occur, the impeller shaft continues to run smoothly and without shaking and vibrating. Therefore, a mechanical seal can be expected to last longer in a tapered sleeve installation. Therefore, in the systems as described herein, it can be expected that cavitation would be much less likely to cause premature failure of a mechanical seal.

Another reason why the systems as described herein promote good mechanical seal life is that, in many cases the pressure in the exit chamber can be regulated such that the mechanical seal sees only a small pressure differential. If the pressure differential is small enough, it is possible to get away with a cheap lip seal, in place of an expensive mechanical seal, between the exit chamber and the process chamber. However, in most cases, spurious circumstances can arise (for example, when the motor stalls) in which the pressure differential might increase sharply, whereby a lip seal would be breached, and so the mechanical seal is needed anyway.

In cases where it does not matter if the barrier liquid is discharged into the process fluid, no seal is need at all between the exit chamber and the process. But of course, if the exit chamber is open to the process fluid chamber, the pressure in the exit chamber cannot be anything but equal to the pressure of the process fluid, and the designer is constrained by that, and with the fact that the pressure in the exit chamber cannot be independently regulated just for the purposes of protecting the pump seals.

Figure 15:
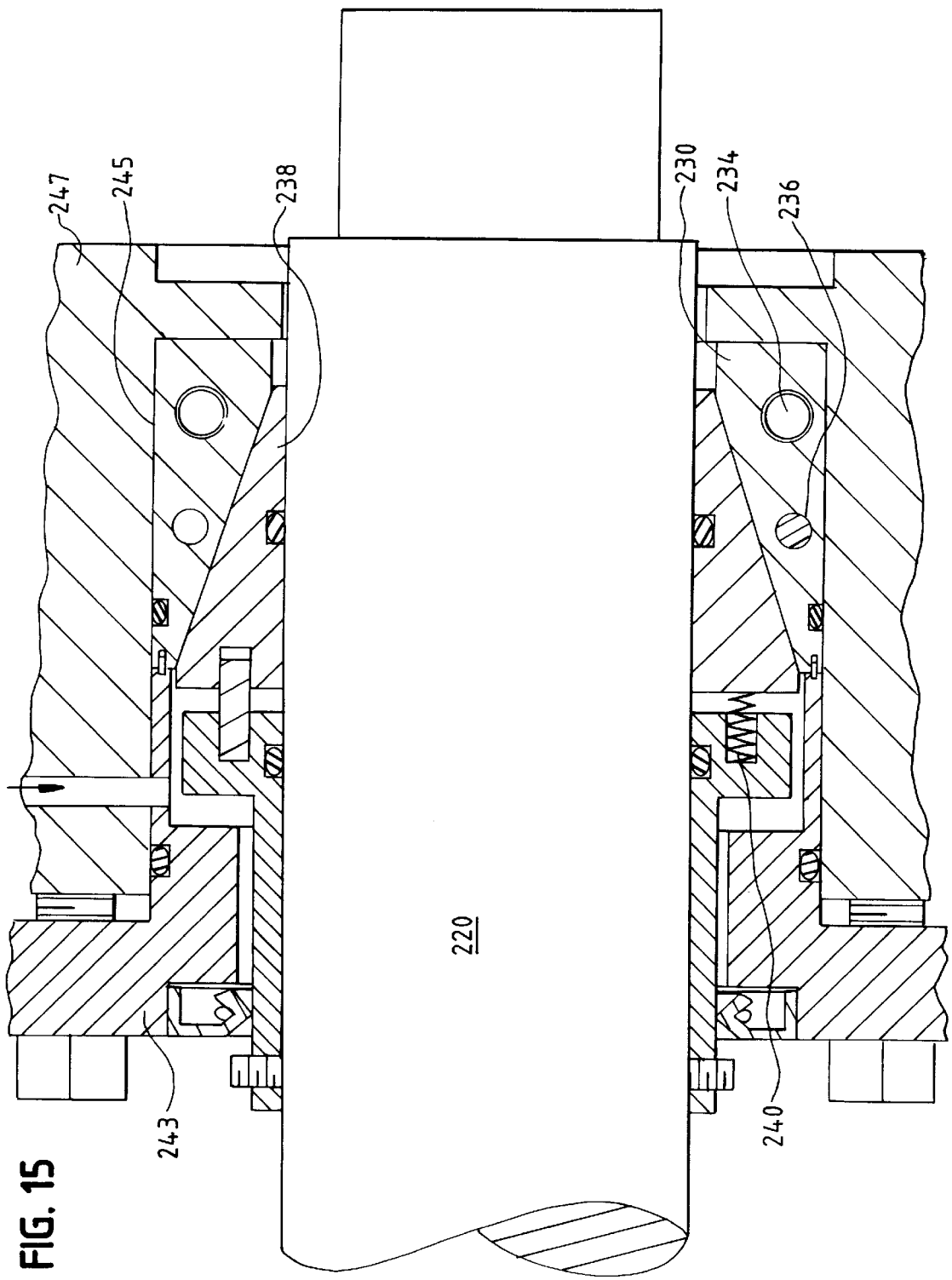
FIG. 15 is a cross-section of a split-seal installation for a rotary machine.

FIG. 15 shows another version of the technology of the barrier-liquid-transporting spiral-grooved tapered-sleeves technology. In FIG. 15, the tapered sleeve components are split each into two halves, so that the components can be assembled radially around the shaft 220. This is useful in cases where maintenance needs to be carried out to the components at a time when there is no access to an end of the shaft. (Generally, with the impeller pumps as described in previous embodiments herein, there is no problem with access to an end of the shaft, so split components would not be needed. In FIG. 15, the shaft 220 is shown diagrammatically, as a component of a machine—not an impeller pump—in which other components on the shaft deny access to the ends.)

In FIG. 15, the stator or outer sleeve 230 is in two half-outer-sleeves, which are bolted together, at 234. Dowels 236 maintain the two half-sleeves in alignment, when they are bolted together.

Similarly, the rotor or inner sleeve 238 is in two half-inner-sleeves. Springs 240 urge the rotor and stator sleeves together. In some cases the two half-inner-sleeves need not be actually bolted together, the half-inner-sleeves being constrained to remain in the correct alignment with each other by the fact that they are being pushed, i.e pushed as a sub-assembly, into the composite outer sleeve. It is a considerable advantage if the inner sleeves do not need to be bolted together, because radial space for the bolts is severely limited. Also, bolting the half-sleeves together might induce some distortions, which might cause the composite rotor sleeve to go (slightly) out of round. In any event, the half-sleeves should be as chunky as possible, whereby the resulting composite sleeve resists distortion.

For assembly, the rotor sleeve 238, and the clamping ring 243, are moved aside, to the left, to allow the bolted-together halves of the outer sleeve 230 to be placed inside the bore 245 in the housing 247. The designer must see to it that there is sufficient space to the left of the housing to allow these components to be withdrawn far enough to allow assembly access.

Figure 16:
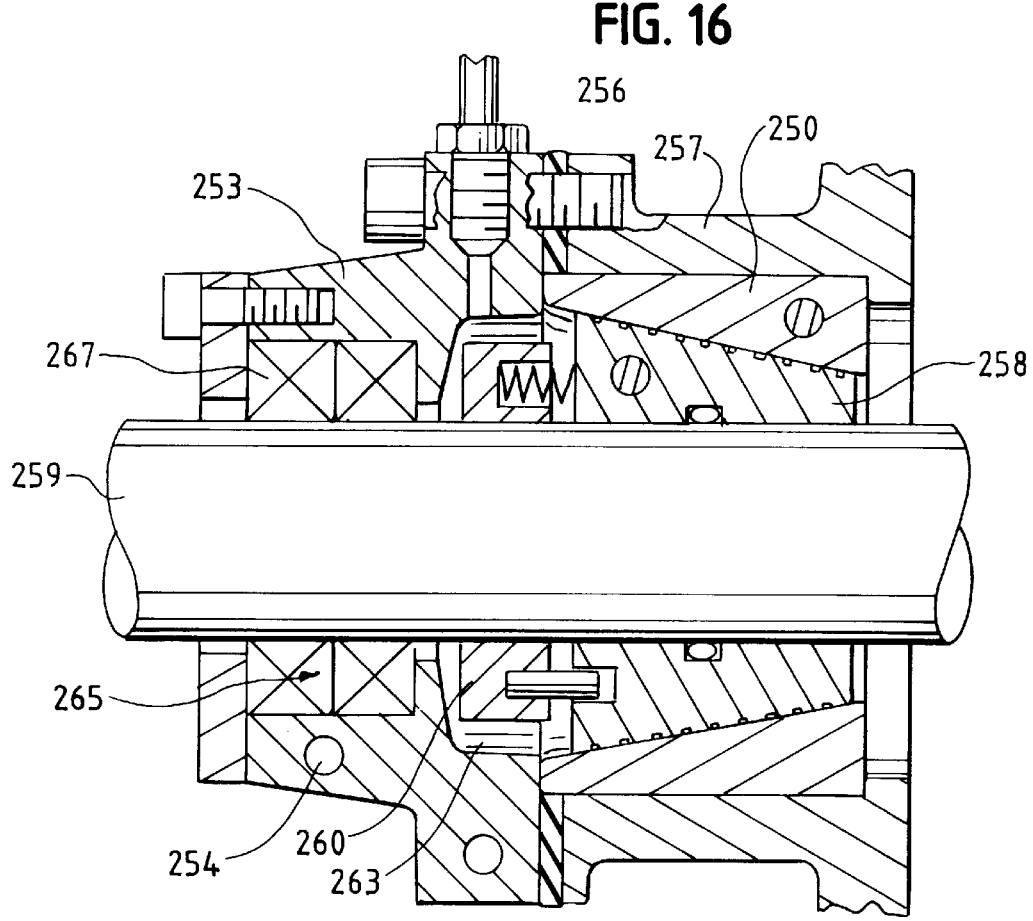
FIG. 16 is a cross-section of another split-seal installation.

In some installations, not only the actual sleeves, but all the components of the seal assembly (apart from the housing itself) are required to be split. FIG. 16 is a diagrammatic illustration of a typical case. Here, the two halves of the outer-sleeve 250 are bolted together. The composite outer-sleeve is held firmly in place in the housing by means of a clamping ring 253, which is tightened in the axial direction onto the outer sleeve. The clamp ring itself is in two halves, bolted together, as at 254. A gasket may be provided between the two halves of the clamping ring 253. A gasket 256 between the composite clamping ring 253 and the housing 257 may also be provided.

The inner-sleeve 258 is also a composite of two half-inner-sleeves, which in this case are bolted together. The composite inner sleeve slides axially on the shaft 259, and the inner sleeve is driven to rotate by its engagement with a drive ring 260. The drive ring 260 is also in two bolted-together halves. The inner diameter of the drive ring 260 is dimensioned so that, when the two halves are tightened together, the drive ring grips the shaft 259 firmly. It may be noted that the inner diameter of the composite inner sleeve 258 is dimensioned to be loose on the shaft 259 when the two halves of the inner sleeve 258 are bolted together, so that the inner sleeve 258 may slide along the shaft 259.

The inlet chamber 263 of the seal assembly of FIG. 16 is connected to a source of barrier liquid, and the chamber 263 is sealed from the atmosphere by the composite seal 265. The gland rings 267 are of the kind that can be wound around the shaft 259.

Of course, a split-seal installation requires much more careful, skilled, assembly work, and to make things even more difficult the work must be done under field conditions. Any O-rings etc that may be required have to made by cutting off a length of rubber, and then, after laying the length around the seal groove, gluing the ends together. however, sometimes it simplifies the design of the machine in other ways if the seal is split, whereby access is not needed to an end of the shaft for seal-maintenance purposes.

Figure 17:
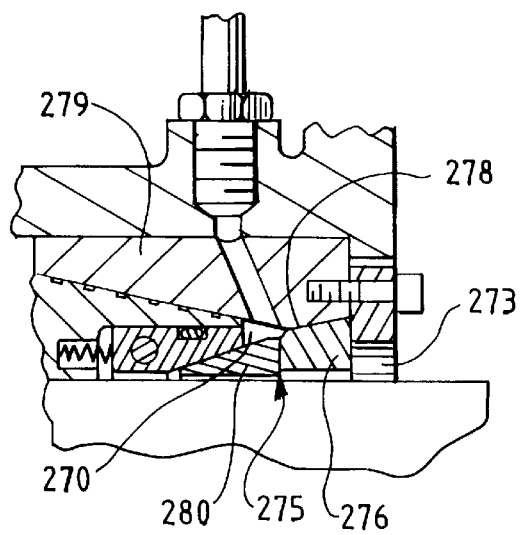
FIG. 17 shows alternatives for some of the components of FIG. 16.

FIG. 17 shows how the right hand end of the FIG. 16 installation might be configured, in a case where the groove exit chamber 270 is sealed from a chamber 273 to the right by means of a mechanical seal 275. Here, the rotor component and the stator components of the mechanical seal are again composites, each comprising two halves. It may be regarded that it is virtually impossible to create a secure mechanical seal if the rotor and stator rubbing rings of the seal are provided as bolted-together halves, and so it is much preferred for the mechanical seal rings to be held together by some means other than bolts. In FIG. 17, the two halves of the stator 276 of the mechanical seal are held together by virtue of the fact that the halves are tapered on the outside, and the halves are pressed tightly together as a result of their being forced into a taper 278 provided in the composite outer sleeve 279. Similarly, the two halves of the rotor 280 of the mechanical seal 275 are not bolted together, but are held together by being pressed into the (composite) tapered component 279. It may be noted that the use of a tapered collet, to hold together the two halves of a split mechanical seal rotor, in this manner, is shown in U.S. Pat. No. 5,370,401 (Sandgren).

Figure 18:
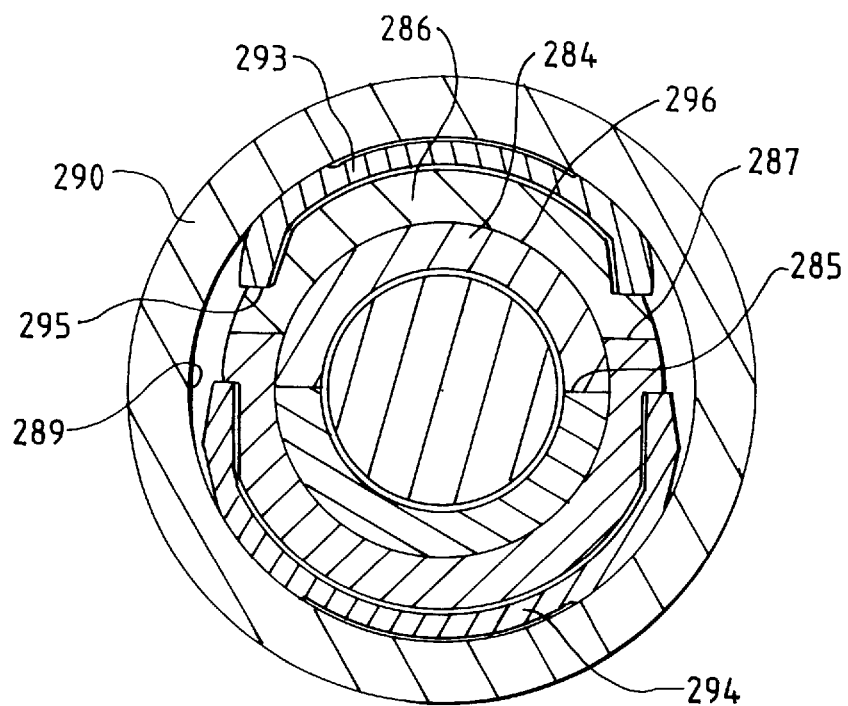
FIG. 18 is an end view, shown in cross-section, of another split-seal installation.
Figure 19:
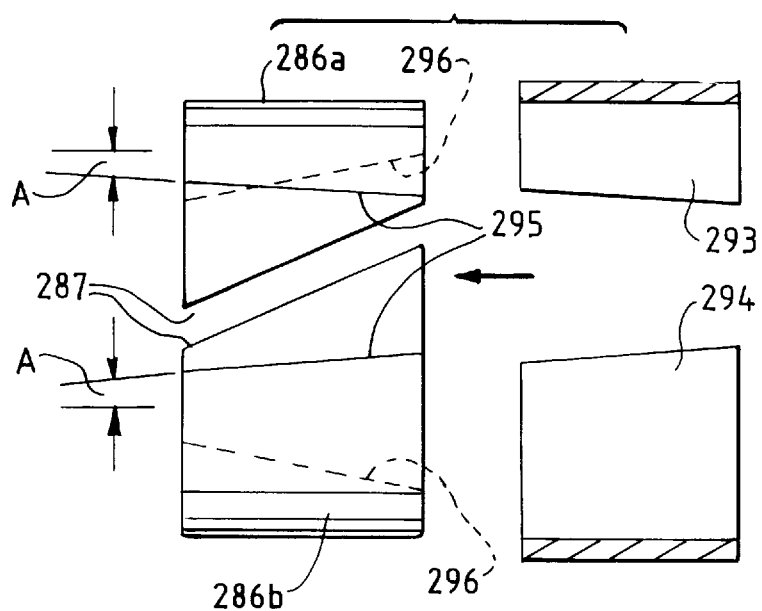
FIG. 19 is a side elevation of some of the components of the FIG. 18 installation, shown during assembly.
Figure 20:
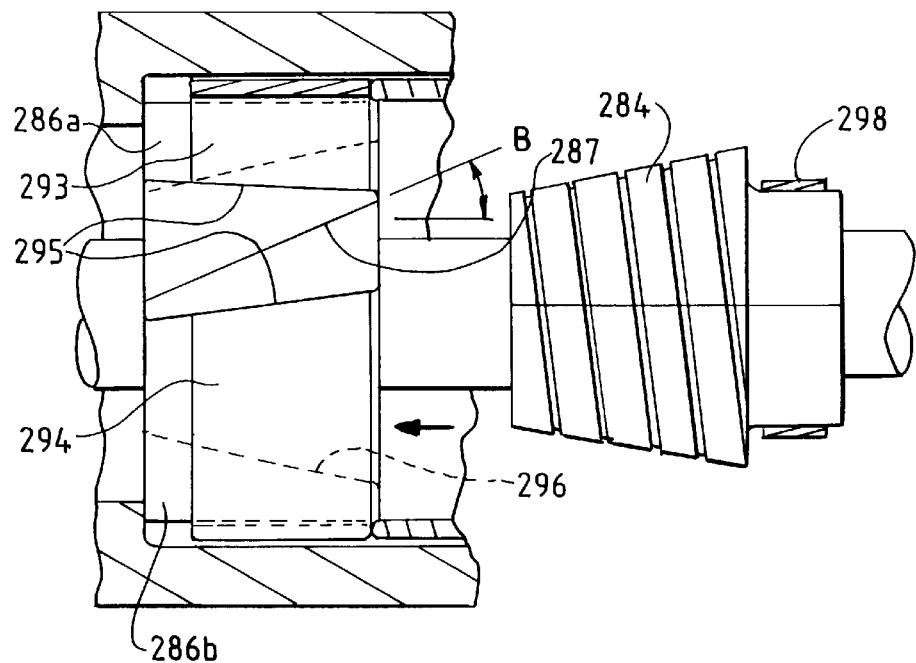
FIG. 20 is a diagram showing a later stage of the assembly.

FIGS. 18,19,20 show another split-seal variation. Here, the rotor or inner sleeve 284 is split along a 180 degree plane 285, whereby the two inner-sleeve-halves are identical. The stator or outer sleeve 286, by contrast, is split along an plane 287 that is offset from the axis. Now, the two halves of the outer or stator sleeve are different as regards their circumferential extent. The purpose of the split in the stator sleeves being offset, as shown, is so that the split plane 287 of the stator sleeve 286 does not coincide with the split plane 285 of the rotor sleeve 284, during running operation.

The inward-facing cylindrical surface 289 in the housing 290, into which the outer sleeve 286 is to be inserted, cannot be relied upon to be accurately predictable as to its diameter, nor indeed as to its circularity. Therefore, when the two halves of the stator sleeve 286 are assembled together, the fit of the outer surface of the resulting composite stator sleeve would be indeterminate and would be of unknown tightness or looseness in the housing 289, irrespective of how accurately the sleeve 286 halves are made. Therefore, it is not practical for the designer to use the fit of the composite outer sleeve 286 into the housing 289 as the means for pressing the two halves of the stator together. Still, the designer wishes to avoid having to use bolts to secure the two halves of the stator together.

FIGS. 18 shows the provision of wedge-pieces 293,294 between the housing 289 and the respective two halves 286a,286b of the stator sleeve 286. Platforms 295 are provided on the stator halves. These platforms lie at an angle A to the shaft axis, as shown in the FIG. 19 view. The platforms 295 are engaged (FIG. 19) by the wedge pieces 293,294, which are inserted into the space between the outer sleeve 286 and the housing 289. When pressed fully home (FIG. 20), the wedges 293,294 serve to drive the two halves 286a,286b of the stator sleeve firmly together.

During manufacture of the halves of the stator sleeve, the surfaces that make up the part-plane 287 are ground accurately flat and planar. The final finish-machining of the composite stator is done when the halves are held tightly together at the part-plane 287, whereby the halves lie in the same relative position during operation, as during manufacture.

As shown in FIG. 18, the force urging the halves 286a, 286b of the stator sleeve into contact is not applied evenly over the circumference of the housing, but is concentrated at four points. However, if the housing distorts out of round as a result, that is not too important. The important thing is not that the housing be circular but that the inside tapered surface 296 of the composite stator sleeve should be exactly circular; and that condition is most closely realised when the part-plane surfaces 287 of the stator halves are pushed together very firmly, and no other forces are applied to the stator halves.

As to the rotor, the two halves of the rotor sleeve 284 may be left to centre themselves within the stator sleeve 286 during operation, or alternatively the rotor halves may be held together by a suitable strap 298 (FIG. 20). A dowel may be provided between the two halves to keep them in the correct axial correspondence relative to each other.

In the rotor, the part line 287 between the two halves should lie at the symmetrical 180 degree. If the part line 287 were offset, the tips of the limbs of the C-shape of one of the halves would be closer together than the diameter of the shaft, whereby that half would not fit over the shaft. In the interests of making sure the part-line 287 in the stator and the part-line 285 in the rotor interfere with each other as little as possible, and given that the part-line 285 in the rotor has to be in the 180 degree symmetrical plane for assembly reasons, the part-line 287 in the stator is not only offset to a chord of the stator (FIG. 18) but the part-line 287 in the stator is also disposed at an angle B relative to the axis (FIGS. 19,20). Thus, during operation, the part-line 285 in the rotor sweeps progressively over the part-line 287 in the stator, and so there is little tendency for even any trace of a step to develop in the rotary motion, even though the two halves of the rotor are not bolted together.

It may be noted that the composite rotor or inner sleeve 284 is loose on the shaft, and may slide axially along the shaft, so as to interact with the stator sleeve 286 in the manner as described. The half-inner-sleeves are held in the correct axial location relative to each other by means of a dowel, but otherwise the half-inner-sleeves are free to take their positions from their engagement in the female sleeve.

Figure 21:
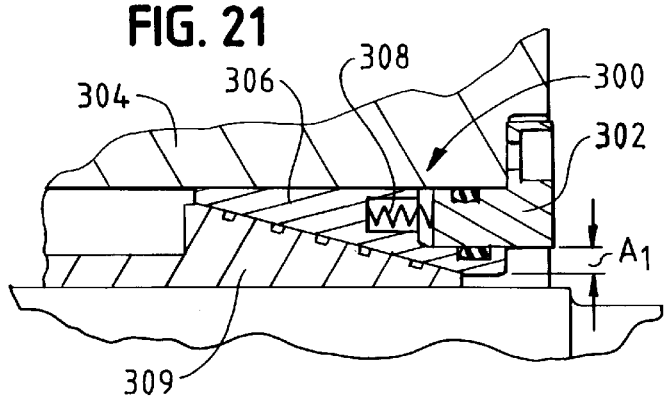
FIG. 21 is a cross-section of another seal assembly for an impeller pump that embodies the invention.

FIG. 21 shows another variation of the technology. The outer stator sleeve 300 is in two components. The fixed component 302 is bolted to the housing 304, and the sliding component 306, which carries the tapered surface, is mounted for axial sliding. Springs 308 load the sliding component 306 to the left, and into engagement with the grooved surface of the rotor sleeve 309.

During operation, the pressure of the process fluid acts on the annular area A1, which thereby serves to increase the axial engagement force between the two sleeves. The magnitude of the force is determined by the size of the area A1.

Figure 22:
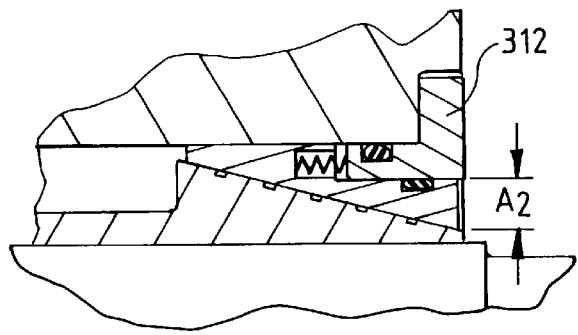
FIG. 22 is a cross-section of a further seal assembly for an impeller pump that embodies the invention.

In FIG. 21, it may be noted that the fixed component 302 is radially quite thick, whereby the area A1 is comparatively small. In FIG. 22, it may be noted that the annular area A2 is much larger, since the fixed component 312 is now radially quite thin.

Providing the stator as such a sub-assembly of two components is particularly useful in the case of a spiral-groove tapered-sleeve seal that is used in a standard size of pump. The seal manufacturer offers a range of stator sub-assemblies, having different values of the annular area, A1, A2, etc, but otherwise identical, and all able to be fitted in the standard pump. Knowing the pressure at which the pump operates, knowing whether the pressure will vary, knowing whether process pressure might remain when the pump motor stops, etc, the pump engineer can then select the annular area A1, A2, etc of the stator sleeve 300 that will provide the desired force on the tapered interfaces, everything else being equal. Without the two-component arrangement, the whole of the end face of the sliding stator sleeve 306 is exposed to the process pressure; this might cause the sleeves to be pressed together too hard, which might cause the surfaces to make contact.

Care should be taken by the designer of the sealing system as to what will happen if, in the system, the process fluid can remain under pressure when the pump stops. Now, no pressure is being generated by the spiral groove, and if the sleeves should ease apart slightly, if a high process pressure is present, the process fluid will run between the sleeves, causing them to burst apart, and the process fluid to leak through. Thus, in a case where the exit chamber is open to the process fluid, the designer should consider the effects of the tapered interfaces separating under a high process-pressure when the pump is stalled.

It is proposed that the velocity or rate of flow of barrier liquid along the spiral groove may be considered as follows, wherein the flow-rate is calculated as if the flow were solely the flow attributable to an archimedean screw effect. That is to say, the assumption is made that the volume of barrier liquid delivered to the exit chamber per revolution of the rotor is the volume contained in one turn of the groove.

Thus, the volumetric flow rate is determined as A×L×W (factoring in a constant appropriate to the units in which the parameters are measured), where A=the cross-sectional area of the groove; L=the circumferential length of one turn of the groove: and W=the speed of rotation of the rotor.

Of course, this simple relationship assumes there are no subtractions from the flow rate due to friction, viscosity, leakback, etc. In practice, when the pressure in the exit chamber is hardly more than the pressure in the entry chamber, it has been found that the actual measured flow rate is between one half and one tenth of the flow rate predicted by the above ALW calculation. It is proposed that this is close enough to expectations for it to be postulated that the barrier liquid is caused to flow along the groove on the same basis that liquid is caused to flow by the action of an archimedean screw in a cylinder. As would be expected, it is found that the flow rate falls as the back-pressure in the exit chamber rises.

Taking the archimedean screw analogy a little further, it may be surmised that the hydrodynamic film that is present in the lands between the turns of the groove serves to seal what in an archimedean screw would be the tips of the screw threads to the cylinder. It should be pointed out that the hydrodynamic film provides a very low-friction, and long-lasting, seal. Also, it may be noted that the hydrodynamic effect (in which liquid is drawn between, and forms a film between, relatively moving surfaces) is a tenacious one, whereby even when the liquid is water the film tends to keep the metal surfaces separated, provided the surfaces are as smooth and perfect as possible, and provided the area of inter-engagement between the surfaces is large. Thus, in order for the spiral groove to create a maximum flow rate, and for the flow to be able to overcome the highest pressure that might be found in the exit chamber, the lands between the turns of the groove on the rotor should be wide, and the surface comprising the lands on the rotor should be lapped as perfectly as possible to the inside tapered surface of the stator.

I claim:

1. Apparatus for a rotating shaft, comprising a stator component, and a rotor component adapted for rotation about the axis of rotation of the shaft, wherein:
   the rotor and the stator components are formed with complementary tapered bearing-surfaces coaxially disposed about the axis;
   the bearing-surfaces of the rotor and stator components are so arranged as to sweep each other in a hydro-dynamic-bearing relationship, over an area termed the bearing area, upon rotation of the rotor;
   one of the bearing-surfaces is formed with a continuous spiral groove, which extends in a spiral configuration along and around the bearing-surface, over the bearing area;
   the spiral-groove comprises several turns extending over the bearing-surface, the arrangement thereof being such as to leave lands between adjacent turns of the spiral-groove;
   the apparatus is so structured that the spiral-groove has an entry-mouth and an exit-mouth;
   apparatus is so structured as to define an entry-chamber and an exit-chamber, being chambers which are in fluid-conveying-communication with the entry-mouth and the exit-mouth respectively;
   the apparatus includes a means for receiving a barrier-liquid from a source of barrier-liquid, and for conveying the barrier-liquid to the entry-chamber;
   the apparatus is so structured that the fit of the bearing-surfaces ensures the establishment and the continuance, during rotation, of a hydro-dynamic film between the bearing-surfaces.

2. Apparatus of claim 1, wherein the complementary bearing-surfaces lie fitted together in a male-female configuration over the bearing area.

3. Apparatus of claim 1, wherein the bearing surfaces have a progressively-reducing-diameter form.

4. Apparatus of claim 3, wherein the apparatus includes a means for guiding one of the rotor or stator components for axial movement relative to the other, and the apparatus includes a means for urging that component axially, in the sense to urge the tapered surfaces together.

5. Apparatus of claim 1, wherein the apparatus is suitable for installation in a process-fluid-transfer machine, which defines a process-chamber containing a process-fluid under pressure, and in which a rotating shaft of the machine extends through the apparatus; and the rotor and stator fit around the rotary shaft.

6. Apparatus of claims 4 or 5, wherein the means for urging the movable component axially is an area of the component which is so arranged as to be exposed, when the apparatus is installed in the machine, to process-fluid pressure, and which is so configured that the higher the process-fluid pressure, the greater the force urging the tapered surfaces together.

7. Apparatus of claims 4 or 5, wherein the means for urging the movable component axially is hydraulic, and is derived from an area of the component exposed to liquid pressure in the exit chamber.

8. Apparatus of claims 4 or 5, wherein the means for urging the movable component axially is a mechanical spring.

9. Apparatus of claim 1, wherein:
   the apparatus includes a first seal, being a seal of a surface-rubbing kind in which a means is included for resiliently urging sealing-surfaces of the seal together into rubbing, sealing, contact;
   the first seal is so located as to seal and separate the entry-chamber from the outside environment.

10. Apparatus of claims 5 or 9, wherein:
    the apparatus includes a second seal, being a seal of the said surface-rubbing kind;
    the second seal is so located, when the apparatus is installed in the machine, as to seal and separate the exit-chamber from the process-chamber.

11. Apparatus of claim 10, wherein the first seal is a flexible-lip type seal, and the second seal is a mechanical seal, where surfaces of relatively hard material are resiliently rubbed together.

12. Apparatus of claim 5, in combination with the machine, wherein:
    the machine is a centrifugal pump which has an impeller mounted on the shaft;
    the apparatus is so located with respect to the machine that the bearing surface lies axially-spaced from the impeller by no more than 1 diameter of the shaft.

13. Apparatus of claim 4, wherein the included angle of taper of the tapered surfaces is between 7 degrees and 30 degrees.

14. Apparatus of claim 1, wherein the spiral-groove extends in a continuous, regular, uninterrupted, open-ended, helix, over the bearing surface.

15. Apparatus of claim 1, wherein the spiral-groove is of the single-start type.

16. Apparatus of claim 1, wherein the overall length of spiral-groove is at least 30 cm.

17. Apparatus of claim 1, wherein the width of plain land between adjacent turns of the spiral-groove is at least 2 mm.

18. Apparatus of claim 1, wherein the aggregate of all land widths over the bearing area is at least half of the average of all diameters of the bearing surface.

19. Apparatus of claim 1, wherein a cross-sectional area of the spiral-groove is less than 1 sq mm.

20. Apparatus of claim 1, wherein a cross-sectional area of the spiral groove is more than 0.3 sq mm.

21. Apparatus of claim 1, wherein the spiral-groove is on the rotor, and the surface of the stator is plain and un-grooved.

22. Apparatus of claim 21, wherein the rotor is male.

23. Apparatus of claim 1, wherein the apparatus includes a pressure regulation system, which is effective to regulate the pressure in the exit-chamber and the pressure in the entry-chamber.

24. Apparatus of claims 5 or 23, wherein the apparatus includes a means for measuring the pressure of the process-fluid, and the pressure regulation system is effective to regulate the pressure of the exit-chamber to a proportionate value close to pressure of the process-fluid.

25. Apparatus of claim 1, wherein the means for conveying barrier-liquid to the entry-chamber, and the means for conveying barrier-liquid away from the exit-chamber, are connected together in such a manner as to convey barrier-liquid present in the exit-chamber back into the inlet-chamber, whereby the barrier-liquid circulates and re-circulates through the spiral groove.

26. Seal assembly apparatus for a rotating shaft having an impeller and mounted for rotation within a housing comprising a stator component and a rotor component adapted for rotation about the axis of rotation of the shaft, characterized in that the apparatus includes the following features, in combination:

the stator and rotor components are annularly and coaxially disposed about the shaft axially adjacent to the impeller and have complementary axially tapered surfaces for fitting together in a male-female configuration, the rotor being secured for rotation with the shaft and the stator being secured to the housing;

one of the complementary surfaces is formed with a continuous spiral groove which extends in a spiral configuration around the surface, the spiral groove having open entry and exit mouths at opposite axial ends, and the complementary surfaces are configured for positively pumping a barrier fluid for sealing toward the impeller fully across the surface upon rotation of the rotor;

and a means for receiving a barrier fluid from a source of barrier fluid, and for reliably conveying the barrier fluid to the open entry mouth of the spiral groove.

27. The seal assembly of claim 26, wherein said complementary surfaces are so configured as to sweep each other in a hydrodynamic-bearing relationship.

28. The seal assembly of claim 26, wherein the spiral groove is on the rotor's complementary surface, and the complementary surface of the stator is plain and un-grooved.

29. The seal assembly of claim 28, wherein said rotor is male.

30. The seal assembly of claim 26, wherein and angle of axial taper of each said complementary tapered surface is less than 30°.

31. The seal assembly of claim 26, wherein one of said rotor and stator is disposed for axial movement relative to said shaft, and further including an arrangement for axially urging that one against the other such that said complementary surfaces are kept in a tight running clearance relationship.

32. The seal assembly of claim 31, wherein said arrangement is a mechanical spring.

33. The seal assembly of claim 26, wherein the barrier fluid is water-based.

34. The seal assembly of claim 26, wherein the barrier fluid is drawing from the process fluid being acted upon by said impeller.

35. The seal assembly of claim 26, wherein the barrier fluid is separate from process fluid being acted upon by said impeller.

36. The seal assembly of claim 26, including in said housing an exit chamber in fluid communication with the exit mouth of said spiral groove, said exit chamber receiving barrier fluid discharged under pressure from said exit mouth.

37. The seal assembly of claim 26, wherein said exit chamber is separated from a process chamber in which said impeller rotates by a seal subassembly.

38. The seal assembly of claim 37, including a pressure regulation system for regulating the pressure of the barrier fluid in said exit chamber to a proportionate value close to pressure of process fluid in said process chamber.

39. The seal assembly of claim 38, wherein the barrier fluid is water-based.

40. Apparatus of claim 1, wherein the apparatus includes a means for conveying barrier-liquid away from the exit-chamber.

41. Apparatus of claim 40, wherein the apparatus is so configured that, upon rotation of the rotor, the barrier-liquid flows along the spiral-groove from the entry-mouth to the exit-mouth.

42. Apparatus of claim 3, wherein the bearing surfaces are right-conical in form.

43. Apparatus of claim 8, wherein the configuration of the apparatus is such that the spring urges the movable component in the direction to urge the tapered surfaces into engagement.

44. Apparatus of claim 7, wherein the configuration of the apparatus is such that the hydraulic force due to the said pressure urges the movable component in the direction to urge the tapered surfaces apart.

45. Apparatus of claim 2, wherein:

the rotor component is a male or inner sleeve, and the stator component is a female or outer sleeve;

the bearing surfaces are provided respectively on the sleeves, the bearing surfaces being arranged in a tapered configuration;

the assembly is suitable for radial fitment around a shaft;

the inner-sleeve is composite, comprising a first half-inner-sleeve and a second half-inner-sleeve, which are separable, and when separated can be assembled over the shaft, and can be brought together over the shaft to a position of alignment to form the inner-sleeve;

the outer-sleeve is composite, comprising a first half-outer-sleeve and a second half-outer-sleeve which are separable, and when separated can be assembled over the shaft, and can be brought together over the shaft to a position of alignment to form the outer-sleeve.

46. Apparatus of claim 45, wherein the apparatus includes a means for fastening the half-outer-sleeves together, in such a manner as to combine a large force acting in the direction to constrain the half-outer-sleeves from separating at their part-plane, with a small force acting in the direction parallel to the part-plane.

47. Apparatus of claim 45, wherein the part-plane between the first and second half-inner-sleeves is flat, and is diametral with respect to the shaft axis, and the shaft axis lies in the part-plane.

48. Apparatus of claim 47, wherein the part-plane between the first and second half-outer-sleeves is flat, and is offset radially from the shaft axis.

49. Apparatus of claim 48, wherein the outer sleeve part-plane lies at a substantial angle to the shaft axis.

\* \* \* \* \*